(12) United States Patent
Hallock

(10) Patent No.: US 11,102,648 B2
(45) Date of Patent: Aug. 24, 2021

(54) SYSTEM, METHOD, AND APPARATUS FOR ENHANCED PERSONAL IDENTIFICATION

(71) Applicant: Richard James Hallock, Naples, FL (US)

(72) Inventor: Richard James Hallock, Naples, FL (US)

(73) Assignee: ProteqsIT LLC, Naples, FL (US)

( * ) Notice: Subject to any disclaimer, the term of this patent is extended or adjusted under 35 U.S.C. 154(b) by 27 days.

(21) Appl. No.: 16/658,046

(22) Filed: Oct. 19, 2019

(65) Prior Publication Data

US 2020/0053558 A1 Feb. 13, 2020

Related U.S. Application Data

(63) Continuation-in-part of application No. 16/244,888, filed on Jan. 10, 2019, now abandoned, which is a
(Continued)

(51) Int. Cl.
| | | |
|---|---|---|
| *H04W 12/033* | (2021.01) | |
| *G06F 21/32* | (2013.01) | |
| *H04L 9/06* | (2006.01) | |
| *H04W 12/06* | (2021.01) | |
| *G06N 20/00* | (2019.01) | |
| *G06N 7/00* | (2006.01) | |

(52) U.S. Cl.
CPC .......... *H04W 12/033* (2021.01); *G06F 21/32* (2013.01); *G06N 7/005* (2013.01); *G06N 20/00* (2019.01); *H04L 9/0656* (2013.01); *H04W 12/068* (2021.01); *G06F 2221/2133* (2013.01)

(58) Field of Classification Search
CPC . H04L 63/0861; H04L 63/0853; G06N 20/00; H04W 12/06
See application file for complete search history.

(56) References Cited

U.S. PATENT DOCUMENTS

| | | |
|---|---|---|
| 4,532,508 A | 7/1985 | Ruell |
| 5,442,342 A | 8/1995 | Kung |
| (Continued) | | |

OTHER PUBLICATIONS

Kent German. "Why you want a dual-SIM phone" article published Feb. 28, 2013 (4 pages) https://www.cnet.com/news/why-you-want-a-dual-sim-phone/.

(Continued)

*Primary Examiner* — Mohammed Waliullah
(74) *Attorney, Agent, or Firm* — Larson & Larson, P.A.; Frank Liebenow; Justin P. Miller

(57) ABSTRACT

Within a mobile device, a method and system to produce a probability the mobile device is in possession of a known person, the first user. Sensors are used to detect and quantify the behavioral biometrics of the human traits of the person in possession of the device. On a continuous basis, a machine learning process collects the biometrics of several traits of the first user memorizing the artifacts of neural networks used for learning. Subsequently, a prediction neural network provisioned with these artifacts and processing new biometric inputs of the present user of the device produces a probability the present user of the device is the first user. Affirmation of identity can then be made based on that probability.

5 Claims, 10 Drawing Sheets

Related U.S. Application Data continuation-in-part of application No. 16/019,578, filed on Jun. 27, 2018, now Pat. No. 10,216,914, which is a continuation-in-part of application No. 15/430,637, filed on Feb. 13, 2017, now Pat. No. 10,037,419, and a continuation-in-part of application No. 15/234,625, filed on Aug. 11, 2016, now abandoned, and a continuation-in-part of application No. 15/234,652, filed on Aug. 11, 2016, now Pat. No. 10,215,154, said application No. 16/244,888 is a continuation-in-part of application No. 15/430,637, filed on Feb. 13, 2017, now Pat. No. 10,037,419.

(60) Provisional application No. 62/360,616, filed on Jul. 11, 2016, provisional application No. 62/206,333, filed on Aug. 18, 2015.

(56) References Cited

U.S. PATENT DOCUMENTS

| | | |
|---|---|---|
| 6,657,614 B1 | 12/2003 | Ito |
| 7,689,013 B2 | 3/2010 | Shinzaki |
| 8,046,836 B2 | 10/2011 | Isokawa |
| 8,176,159 B2 | 5/2012 | Kashi |
| 8,179,563 B2 | 5/2012 | King |
| 8,249,649 B2 | 8/2012 | Tseng |
| 8,270,726 B2 | 9/2012 | Niinuma |
| 8,302,176 B2 | 10/2012 | Huang |
| 8,364,120 B2 | 1/2013 | Kuhlman |
| 8,558,662 B2 | 10/2013 | Nakajima |
| 8,625,796 B1 | 1/2014 | Ben Ayed |
| 8,634,808 B1 | 1/2014 | Zhong |
| 8,638,363 B2 | 1/2014 | King |
| 8,863,307 B2 | 10/2014 | Sorek |
| 8,887,187 B2 | 11/2014 | Ohmae |
| 9,141,779 B2 | 9/2015 | Shen |
| 9,160,546 B2 | 10/2015 | Sorek |
| 9,282,086 B2 | 3/2016 | Klein |
| 9,311,464 B2 | 4/2016 | Stuntebeck |
| 9,330,256 B2 | 5/2016 | Gupta |
| 9,400,879 B2 | 7/2016 | Tredoux |
| 10,095,688 B1 | 10/2018 | Schilling et al. |
| 10,257,191 B2 | 4/2019 | Allen et al. |
| 2002/0035542 A1 | 3/2002 | Tumey |
| 2002/0066038 A1 | 5/2002 | Mattsson |
| 2005/0010756 A1 | 1/2005 | Clerc |
| 2005/0057339 A1 | 3/2005 | Ikehara |
| 2005/0097364 A1 | 5/2005 | Edeki |
| 2007/0057763 A1 | 3/2007 | Blattner |
| 2007/0118758 A1 | 5/2007 | Takahashi |
| 2007/0245155 A1 | 10/2007 | Mimura |
| 2007/0253604 A1 | 11/2007 | Inoue |
| 2008/0059807 A1 | 3/2008 | Miller, Jr. |
| 2009/0049544 A1 | 2/2009 | Kashi |
| 2009/0148006 A1 | 6/2009 | Hayasaki |
| 2009/0264155 A1 | 10/2009 | Nakaymama |
| 2009/0320123 A1 | 12/2009 | Yu |
| 2010/0022239 A1 | 1/2010 | Anzai |
| 2010/0188328 A1 | 7/2010 | Dodge |
| 2011/0110364 A1 | 5/2011 | Fried |
| 2011/0212707 A1 | 9/2011 | Mahalal |
| 2011/0285504 A1 | 11/2011 | Puerto |
| 2012/0124662 A1 | 5/2012 | Baca |
| 2012/0198532 A1 | 8/2012 | Headley |
| 2012/0206330 A1 | 8/2012 | Cao |
| 2012/0240204 A1 | 9/2012 | Bhatnagar |
| 2013/0063581 A1 | 3/2013 | Komatsu |
| 2013/0290229 A1 | 10/2013 | Tsukamoto |
| 2013/0291097 A1 | 10/2013 | Tsukamoto |
| 2013/0326600 A1 | 12/2013 | Sorek |
| 2014/0136419 A1 | 5/2014 | Kiyohara |
| 2014/0179276 A1 | 6/2014 | Kang |
| 2014/0181955 A1 | 6/2014 | Rosati |
| 2014/0310803 A1 | 10/2014 | Irie |
| 2014/0317744 A1 | 10/2014 | Turgeman |
| 2014/0341440 A1 | 11/2014 | Walch |
| 2014/0365781 A1 | 12/2014 | Dmitrienko |
| 2015/0058961 A1 | 2/2015 | Sorek |
| 2015/0154436 A1 | 6/2015 | Shi |
| 2015/0206139 A1 | 7/2015 | Lea |
| 2016/0085407 A1 | 3/2016 | Liu |
| 2016/0098705 A1 | 4/2016 | Kurapati |
| 2016/0180068 A1 | 6/2016 | Das |
| 2016/0234023 A1 | 8/2016 | Mozer |
| 2016/0285866 A1 | 9/2016 | Allen |
| 2016/0296142 A1 | 10/2016 | Culbert |
| 2017/0009159 A1 | 3/2017 | Wang |
| 2017/0180345 A1* | 6/2017 | Mohan .................. H04L 63/083 |

OTHER PUBLICATIONS

"Subscriber Identity Module" article from Wikipedia dated Feb. 11, 2016 (15 pages) https://en.wikipedia.org/w/index.php?title=Subscriber_identity_module&oldid=704396028.

"Liveness Detection for Biometric Authentication in Mobile Applications" Zahid Akhtar, Christian Michelon and Gian Luca Foresti, University of Udine, Italy Email: { zahid.akhtar, christian.micheloni, gianluca.foresti }@uniud.it.

* cited by examiner

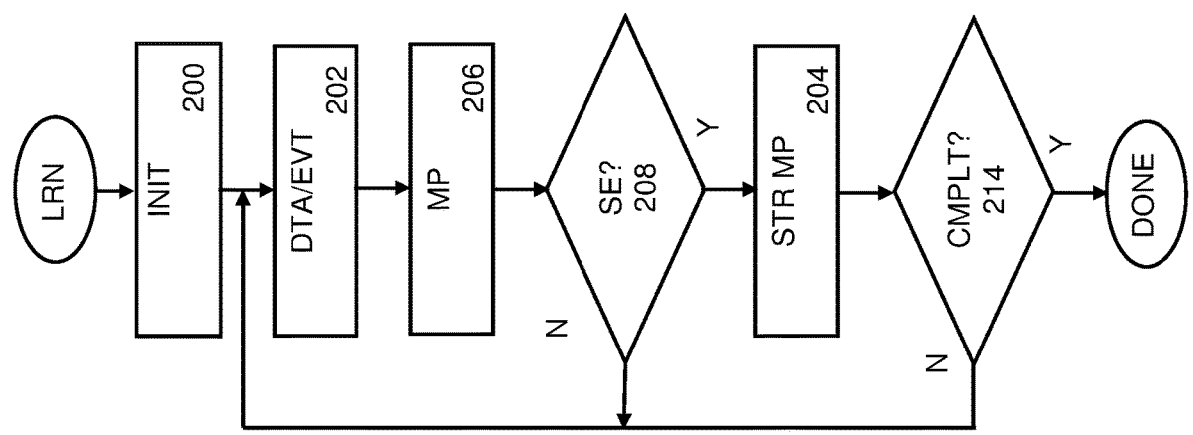

SYSTEM, METHOD, AND APPARATUS FOR ENHANCED PERSONAL IDENTIFICATION

CROSS-REFERENCE TO RELATED APPLICATION

This application is a continuation-in-part of U.S. patent application Ser. No. 16/244,888, filed Jan. 10, 2019; which is a continuation-in-part of U.S. patent application Ser. No. 16/019,578, filed Jun. 27, 2018, now U.S. Pat. No. 10,216,914, issued Feb. 26, 2019; which is a continuation-in-part of U.S. patent application Ser. No. 15/430,637, now U.S. Pat. No. 10,037,419, issued Jul. 31, 2018, which, in turn, claims priority to provisional patent application No. 63/360,616 filed on Jul. 11, 2016. This application also claims priority to patent application Ser. No. 15/234,652 filed on Aug. 11, 2016, which, in turn, claims priority to provisional patent application No. 62/206,333 filed on Aug. 18, 2015. This application also claims priority to provisional patent application No. 62/615,780 filed on Jan. 10, 2018, and provisional patent application No. 62/720,664 filed on Aug. 21, 2018. The above-noted applications are incorporated herein by reference in their entirety.

FIELD

This invention relates to the fields of security, identification and access management and more particularly to a system or method for determining that a person, hereinafter the First User, is who they claim to be based on querying a device in their possession.

BACKGROUND

Computer security has become a paramount issue. Take for example, the recent hacking into many email systems. Today, many systems are protected with encryption keys, passwords, rolling security keys, biometric detection, etc., yet hackers are still able to find openings in existing "secure" systems. It has long been accepted that a single device on a network becomes the weakest link and improper protection of that single device often makes the entire network vulnerable.

A single device becomes vulnerable through poorly crafted passwords (e.g. "password!" or "password1"), through poor account management (e.g., having an account on the device that is not password protected), by opening the wrong email, by browsing to a web site that has trap doors, etc. This single device also becomes vulnerable through lack of physical security such as forgetting the device in the seat-back pocket on a flight.

Unfortunately, security places a burden on the user of the device, having to remember passwords to access the device, using a biometric scanner each time the device is used, storing and managing keys, etc. The greater this burden, the more likely the user will find shortcuts, use simpler passwords, write down passwords, change time-outs to keep the device open longer, etc. Each shortcut severely weakens the security of the device.

Physical access security, like computer security, is likewise a concern and has been since the dawn of mankind. Visiting a major public event, arriving at the airport to board a plane or, in most cases, the simple act of entering one's place of employment demonstrate clearly the ever-increasing attention to physical security.

Personal identity security, like computer and access security, has come into intense and increasing focus due to the rapid increase in occurrences of identity theft. In 2005 very few had ever heard of income tax return identity theft and in 2015 such identity theft was a concern of many American taxpayers and the Internal Revenue Service. So pervasive is the identity theft scourge that by 2016 monitoring and providing identity theft warning services became a multi-billion-dollar business model, a service that notifies one of occurrence of, not protection from, identity theft. Researchers report that in 2017, 43,000 successful cybercrimes were leveraged by compromised credentials used in impersonation attacks.

Throughout modern history, there has been and remains the need to establish the identity of a person, especially related to the use and access of a device and/or system but also as it relates to physical access security and personal identity security. There is an urgent need for the ability to establish that a person is who they claim to be. Throughout that same history, there have appeared actors who would usurp the identity of others for their benefit. Such activity is often referred to as "identity theft" or "impersonation" or other euphemisms which collectively mean that one person has taken on the identity of another person more often than not for ill-gotten gains or to perform some nefarious act that may include physical harm to individuals and/or property or of complete societies, doing so while hiding behind the identity of an innocent individual.

Existing personal identifiers come in many different forms, shapes, and sizes. In the physical space, examples include driver's licenses, social security cards, identification cards, birth certificates, passports and so on. In cyberspace, there are user names and passwords, secret phrases, one-time use integers, PINs, biometrics and more packaged as one, two or three-factor authentication schemes. The common thread of all prior art is dependence on a credential employed to establish one is who they claim to be. A credential solicited from and accepted from an unknown source. The unknown source could be and increasingly is, virtual reality like bot mimicking a person or a real human, both of which are attempting to impersonate the person the solicited credential belongs to. The number of times such impersonation attempts succeed is increasing at an alarming rate.

Application of these various forms of personal identifiers are also many and varied but typically follow along the lines of: a person seeks access to a protected resource; the outer layer of security delivers a challenge to the person seeking access; personal identifier credentials of some nature are presented in response to the challenge; presented credentials are evaluated on two levels: are they valid and are they suitable to allow the access being sought; and upon verification the personal identifier is acceptable, the presenting person is granted access. This scenario plays out when the personal identifier is a physical thing such as: when a driver's license or passport is presented before boarding a plane. A similar scenario plays out in the cyber world when a user name and password are required to access online accounts, or a PIN is required to enter one's place of employment. It is nearly impossible to make it through a day without being challenged to prove one's identity by the presentation of some form of personal identifier.

There are failings of prior mechanisms that allow actors to usurp the personal identifier of a victim and to use that personal identifier to undertake an "impersonation attack."

One failing of all prior mechanisms is the statically stored credential: the password, the single-use token, the secret phrase, the biometric image, or the driver's license, passport or birth certificate. If an object is stored as a static thing, the object implicitly becomes available for discovery, hijacking, forgery, and theft.

Another common failing of all current identification systems is a reliance on authentication of the credentials presented, not the unknown person presenting them. Any unknown person or bot can present the good credentials of another person and in doing so, will be authenticated and granted access.

What is needed is an ability for a person to produce evidence derived in real-time establishing they are who they claim to be; a device that is uniquely identifiable on a worldwide basis, impossible to duplicate, known to belong to the person and having the ability to affirm from real-time calculations that the person in possession of the device is the person the device is assigned to, and thus the presenter is, therefore, the person they claim to be, hereinafter the first user.

SUMMARY

Everyone has habits, preferences, abilities, and mobility traits. One person is left-handed, and another is right-handed. One person has blue eyes, another brown and yet another has hazel eyes. One person is female, the other male. One person holds a cell phone vertical at eye level; another person holds a cell phone at chest height at a 45-degree angle. One person uses two fingers to type on a touch screen, another type with a single finger. One person types at a very slow speed, another type very fast. One person drives to work each day using the same route. One person is always at home by 9:00 PM. One person walks with a specific gait with certain step frequencies, modes, strides, paces, speed, etc. One person jogs or runs or sprints while another person does not. All of these traits, habits, preferences, behaviors, etc., are recognizable and when considered collectively, can be used to uniquely identify the person who manifests the given set of known traits. A device configured to capture, learn, and monitor such traits resulting from device usage by a first user in possession of the device acquires the wisdom to know when the user in possession is that first user. If that device is uniquely addressable on a worldwide basis and if that device can report this wisdom, then that device becomes the perfect personal identifier.

In such, an application running on a mobile device, such as a cell phone, performs logic as a surrogate of the personal identifier of the person to whom that device is assigned or belongs. The application uses sensors and inputs of the device to learn the biometrics of physical, physiological, environmental, or human activity traits, hereinafter "IDTRAITS," of a first user of the device. Machine learning is a continuous process capturing and processing the biometrics of the IDTRAITS to produce a knowledge base profile of the first user. The profile is further refined over time to become more accurate and to accommodate lifestyle changes. Subsequent to learning the traits of a first user, those same sensors are employed to monitor the usage of the device and to calculate proper possession in real-time in such a way as to affirm or deny that the user in possession of the device is the first user to which the device belongs.

The application of the personal identifier device is a real-time process performed on the instant, periodically, or continuously; without requiring users to remember credentials, providing proof that is inextricably linked to a specific device that is unique on a worldwide basis and known to belong to or be assigned to the first user of the device. An imposter will find it virtually impossible to usurp the personal identifier and therefore ultimately impossible to impersonate the first user to gain access where access should be denied.

By knowing in advance who a device belongs or is assigned to and by querying that device at any given point in time, an inquisitor can learn with certainty if the device is in possession of the user associated with the device. As such, inquisitors have a level of assurance that the person is who that person claims to be; simply put, the person is authenticated, not their personal identification credentials.

The present invention relies on the natural inclination of humans to be creatures of habit and on the ability of the personal identifier device to detect, sense and capture measurable values representing human habitual traits by use of sensor circuits contained within the device or sensor circuits that are contained within external devices that are accessed by use of transceiver circuits of the personal identifier device such as Bluetooth networks, near-me area networks or body area networks or other like RF network transceivers. There are many different types of sensors that may be employed, including time and day, accelerometer, ambient temperature, gyroscope, heart rate, blood pressure, glycosometer, oximeter, DNA, weight scale, ambient light, IR (infrared light), magnetometer, atmospheric pressure, proximity, relative humidity, device temperature, touch screen, camera front, camera back, microphone, cell tower, GNSS (GPS, GLONASS, Galileo), UV (ultraviolet light), GFR (galvanic skin response), human temperature, respiration, hydration, and motion (three degrees of freedom, six degrees of freedom) and others, all of which are candidates for deriving a measurable value pertaining to one or more human traits. It's important to note that seldom is it the case that a single sensory input can be used to produce a measurable value of a human trait. In most cases, there is the need to capture inputs from two or more sensors using those captured sensory values to develop a single human trait measurable value sample falling generally in the class of IDTRAITS. Thus, the present invention relies on there being a plurality of sensory inputs representing a subset of those listed here. For example, in some embodiments, the accelerometer and other sensors are used to capture data related to recognition of a person's human trait of self-propulsion in a form such walking, for example, comprising the timing of this person's step, the stride, infirm, pace, mode, as well as whether this person runs, jogs, sprints, etc. It is difficult to mimic another's movement style as everybody's body, and mind are different, producing different sequences and styles of movement as each person moves by walking, jogging, sprinting, running, etc. or if infirm then perhaps by wheelchair, walking stick, crutches, walker or prosthetics.

While humans are creatures of habit, reliance on a single habitual human trait to identify a specific person among all other persons on earth is ill-advised if not outright assured of producing a false-positive result, not to mention the ease with which a single sensory source can be defeated. However, by evaluating a set of multiple human traits relating to IDTRAITS, each of which relies on multiple sensory inputs, it is possible to identify a specific person out of all others on earth without risk of duplication or false-positive results. Hence, the present invention relies on the use of a plurality of measurable values representing human traits using a subset taken from a large collection of different human traits derived by use of generally available sensor technology. A chosen subset of human traits is used to establish an awareness and identity of the first user of the device and subsequently, the potential equality relationship of a present user of the device to the first user of the device. In doing so, the personal identifier device arrives at a conclusion that the present user in possession is or is not the first user.

For example, the most fundamental trait in device-assisted identification is that of device possession by a human and further, the trait of device possession by a specific person. Failing this, the entire process of device-assisted authentication is invalidated. For personal identification, there are three states of device possession by a known first user: the device is not in recognizable possession of the first user, there is positive evidence the device is in possession of the first user, and there is positive evidence the device is in the proximity of the first user. The evidence of each of these is obtained by sensory inputs from sensor circuits of the device. In this way, the device itself affirms possession of the device and further, affirms possession by the first user. This evidence is realized from any combination of different sensors. Examples include: accelerometer, gyrocompass, magnetometer, GNSS, GPS, Wi-Fi, cellular network, Bluetooth network, RF network, IR network, light, camera, microphone, body area network, body sensor network, medical body sensor network.

In another example, the shape of the human ear can be used to identify a person with a high degree of accuracy and uniqueness. By use of device camera, proximity, and infrared sensors the user's ear can be detected every time the device is put to the ear, a frequent occurrence if the device happens to be a smartphone. By capturing images of the ear at that time, values produced by well understood ray-tracing algorithms representative of ear shape, size, and structure are ideal candidates for input to neural network machine learning processes. Subsequent capture, processing, and comparisons by use of companion neural networks can identify matches with 99.6% accuracy.

In another example, the absence of human trait events at expected times can be just as much an indicator of identity as their presence would be. If the first user normally performs a certain activity at a certain time on certain days, then the absence of recognition of activity when expected at a minimum indicates identification uncertainty. The degree of this uncertainty can be substantially increased if more than one human trait monitoring process experiences like findings or if other related activity events are detected as being somewhat normal. Such knowledge at a minimum can sponsor spontaneous verification of user in possession identity and at maximum can influence predictors by decreasing weighting values and thus decreasing predictor output values.

In another example, the location human trait is a strong contributor to establishing the identity of most humans. By use of the time sensor and the GNSS (GPS, GLONASS, Galileo) sensor it is possible to periodically establish the location of the device and hence the location of the user in possession of the device. In some instances, other sensors such as Wi-Fi network, RF sensors, presence sensors, and cell tower identifiers can be used to augment or establish a coarse location.

In another example, the handedness of the present user of the device can be established by the use of a collection of sensors, including touch screen, time, accelerometer, and gyroscope. While the user handedness contributes little to establishing a positive conclusion of the present user as being the first user, in the alternative, if a left-handed present user is in possession of a device belonging to a right-handed first user, then the handedness trait individually establishes the present user is not the first user.

In yet another example, the determination of human traits such as gender, eye size, eye color, eye spacing, hair, hair color, skin color, emotion and facial hair can all be established by use of a set of sensors including touch screen interface 92, accelerometer 8, gyroscope 11, time, and camera 93 (front-facing and/or back-facing). Upon determination, the present user is interacting with the device; one or more images are captured from the front-facing camera and analyzed to establish measurable values for each of these human traits that collectively provide a very reliable determination of the identity of the present user of the device.

In another example, the first user has associated a "tracker" radio frequency device with the personal identification service of the present invention. The tracker (e.g., a nearfield tracker) may be a smartwatch, a wireless wearable or perhaps a small token kept in the wallet, purse or pocket. Production of identification becomes conditioned on tracker presence, thus making it impossible to impersonate while allowing a certain degree of out of possession movement. A tracker also extends the awareness of the presence thereby allowing first user movement in a limited area without actual possession of the personal identification device, such as in an office environment.

By combining these example human traits in a personal identifier device, proof of identity is assured in a way that is, from a practical point of view, impossible to defeat.

There are many possible embodiments of the present invention, each in its way different from any other. However, every embodiment exhibits one attribute in common with all others in addition to the core attributes of the present invention. That is the automatic detection of human traits by sensory inputs. Automatic in the sense of full automation of the process without the occurrence of an outside stimulus other than that producing the sensory input signaling. In other words, the user of the embodiment apparatus is not required to perform any specific activity to trigger the activation and operation of the human trait monitoring methodologies. This automated characteristic is in stark contrast to the prior art wherein a user is required to perform in a singular event a very specific task to satisfy a demand for a credential proof of identity. In the present invention, there is no such demand frozen at an instance in time, on the contrary, human trait recognition and processing is a fully automated process performed on a 24/7/365 basis, power allowing.

Embodiments of the present invention incorporate training and the machine learning process by which the human traits of the first user are captured, learned, and memorized to a first user knowledge base. Learning as used here is the process of producing from sensory inputs a dataset that represents the trait of a first user, and that can be employed as input to a comparator circuit to establish if captured traits of a present user of the device equal those of the first user. Learning is best suited to a mathematical process such as RNN or FFNN Neural Networks. The results of learning are datasets representing the captured human trait at a given instant in time. The datasets are recorded to the first user knowledge base in such a way as to create a timeline of dataset events. Training and learning are carried out throughout sufficient length to facilitate confirmation of user in possession, often a full week or more but not germane to the invention process but rather to the application and embodiment of the process.

Embodiments of the present invention incorporate a process responsible for predicting the probability a human trait event of the present user of the personal identifier device is indicative of a like human trait event of the first user of the device on a time-aligned basis; the first level predictive process. There is a human trait predictive process for each human trait employed in an embodiment. The first level predictive process is periodically occurring at predetermined scheduled times or as a result of the receipt of sensor event notification. Determination the human trait event of the present user in possession is that of the first user is arrived at by capturing the measurable value indicative of the human trait and comparing that value to the like human trait measurable value retrieved from the first user knowledge base relative to the time of the periodic event. The comparator employed can be of any type suitable to the task of establishing equality, such as a neural network used to establish a probability of equality. The comparator results establish the human trait of the present user is either that of the first user or not that of the first user or a user whose identity cannot be determined. In the event of unknown user determination, the present user is prompted to provide proof of identity that when the verified result in a modification to the comparator output probability to either of the other two possible states. Those results are then stored in the first user knowledge base as the most recent human trait first user in possession probability. A separate learn by experience task of the first level predictive process applies knowledge learned to the first user knowledge base to enhance and refine the knowledge base to improve accuracy and to accommodate lifestyle changes.

Establishing the user in possession is the first user of the device by use of a single human trait runs the risk of false-positive results, increased risk of hijacking, and impersonation. Avoidance of these risks, the very same suffered by the prior art, is obtained only by a second level predictive process run on-demand or periodic basis that evaluates the accumulated human trait knowledge of the present user of the device by considering multiple human trait indicators. The collective knowledge of human traits as represented by the most recent human trait first user in possession probability from the first user knowledge base is used to produce a final possession probability factor indicating the device is or is not in possession of the first user. This mathematical process, such as by use of a neural network, is influenced by weights assigned to each type of human factor being monitored. Each human trait is assigned a positive and negative weighting value. The positive weight influences the contribution the human trait makes to an increased probability of equality and the negative weight influences the contribution the human trait makes to a decreased probability of equality. For example, the human handedness trait makes little contribution to a positive learning probability of equality primarily, due to there being many more right-handed humans than left-handed, but an extremely high contribution to negative learning probability of equality. In the event the final probability is inconclusive then the present user of the device is required to produce proof of identity, the results of which are applied to adjust the probability to form a conclusion of the identity of the present user of the device.

In one embodiment, a personal identification system of a device is disclosed. The personal identification system includes a device comprised of a primary network transceiver having a globally unique identifier and a secondary network transceiver of the near proximity type such as personal area network, near-me area network or body area network including a unique identifier, a storage medium, a plurality of sensor circuits and the personal identifier circuits which may be implemented as hardware or software or a combination of both. During a training and learning process, a first user knowledge base of measurable human trait values of IDTRAITS is established and stored on the device. After establishing a first user knowledge base, a first-level predictive session is employed to monitor (on a continuing periodic basis) each of the plurality of human traits to establish a probability of equality between the newly acquired trait values representing the present user of the device and those from the first user knowledge base. The resulting probability is then stored in the knowledge base for the trait being monitored. On a periodic or demand basis a second level predictive session establishes a probability the device is in the possession of the first user by evaluating all first-level predictive session probabilities leading to construction of the personal identifier code, an amalgamation of the probability of possession by first user with the unique SIM network identifier and the unique identifier (BD_ADDR) address of the secondary network transceiver after which the personal identifier is then available for delivery to an inquisitor.

In another embodiment, the personal identifier method operating on a mobile device such as, for example, a cell phone, is disclosed. After a training and learning method is used to establish a first user knowledge base, a first-level predictive method is employed to establish a probability that individual human traits of the present user of the mobile device are representative of the first user of the mobile device. In some embodiments, a second level predictive method is used on a periodic or demand basis to establish from the collection of all human traits the probability of the first level predictive method the present user of the device is the first user of the device. Following second level prediction is the construction of the personal identifier code, an amalgamation of the probability of possession by the first user with the unique SIM network identifier and the unique identifier (BD_ADDR) address of the secondary network transceiver after which the personal identifier is then available for delivery to an inquisitor.

In another embodiment, a method for detection and identification of a human in possession of a mobile device includes capturing biometrics indicative of the first user during an initial machine learning period in which the mobile device is in possession of the first user and requesting that the first user enter a security pin on a touch screen of the mobile device, capturing both a first set of character codes and a first set biometrics of those codes when entered. Also during the initial machine learning period, requesting the first user verify said security pin by reentry on the touch screen and verifying that the character codes entered match the first set of character codes and verifying that the biometrics of the codes when entered match the first set biometrics and detecting motion of the mobile device by reading sensor data from sensors integrated into the mobile device, creating motion indicators from the sensor data, and categorizing the motion indicators, recognizing the motion indicators that are most likely a result of human possession of the mobile device. Then, after the initial machine learning period, recognizing mobile device possession by the human and calculating a probability of possession of the mobile device by the first user by comparing current mobile device possession biometrics with the learned mobile device biometrics indicative of the first user. When the probability of possession of the mobile device by the first user is inconclusive, requesting that the first user verify said security pin by entry on the touch screen and verifying that the character codes entered match the first set of character codes and verifying that the biometrics of those codes entered match the first set biometrics, using affirmative match to weight probability of possession in favor of possession by first user. Exchanging secure messages with a remote apparatus over data communications networks, identifying each message uniquely from all others, securing those message exchanges by use of bidirectional One-Time Pad cryptography keys; and affirming the possession status of the mobile device within those messages as indicative or not of mobile device possession by the first user of the device.

In another embodiments, a method for using One-Time Pad encryption in reoccurring message exchanges between cognizant parties includes One-Time Pad encrypted messages being exchanged intermittently between cooperating parities known as a client Party A and a server Party B wherein One-Time Pad seeds used to produce One-Time Pad keys are of arbitrary size and resulting keys produced from them are equal to or larger than the messages they are used to encrypt. During a registration process the server Party B, provides the client Party A with Party B's One-Time Pad key seed and an agreement of a maximum size of any message exchanged, the Party B One-Time Pad seed s being securely stored by the parties. The client Party B creates a message requiring a response from server Party A, produces a One-Time Pad key from a Party B One-Time Pad seed, creates a new One-Time Pad seed securely storing it locally and attaches it to the message after which the message is encrypted using the One-Time Pad key and then transmitted to server Party B. The server Party B receives the encrypted message from client Party A, produces the One-Time Pad key from a stored Party B One-Time Pad seed, uses that key to decrypt the message removing from the message the Party A One-Time Pad seed. The server Party B creates a query response message and a new Party B One-Time Pad seed, encrypts both using the One-Time Pad key created from a Party A One-Time Pad seed and then transmits the query response message to client Party A. The client Party A receives the response message, decrypts it using the One-Time Pad key created from the Party A One-Time Pad seed, securely storing the Party B One-Time Pad seed included in the message and then processing the response.

A method for mobile device production and processing personal identification numbers that are not susceptible to brute force decoding and are unlikely to be compromised even when PIN codes are known, including creating a secure PIN by a user input on a touch screen of a mobile device, the secure PIN comprising two or more codes in sequential order. During the user input of the two or more codes, capturing each of the codes combined with biometrics of usage of the mobile device including the latency between the present code event and the prior code input event using a latency value of zero for the first input event, and storing the codes and the biometrics of usage of the mobile device, and during a matching process, capturing of a new secure PIN by the user input on the touch screen along with current biometrics of usage of the mobile device, matching the new secure PIN, and current biometrics of usage of the mobile device with the secure PIN, and biometrics of usage of the mobile device that were stored thereby establishing a truth of whether there is a match.

The purpose of the personal identifier as disclosed in the present and all prior references is to identify the first user of the personal identification device. While an exemplary use of this knowledge is remote authentication for access, there are other instances where the identity of the person in possession of the device is required or beneficial. One such case is "speaker identification." There are multiple applications that could now or in the future benefit from accurate and secure user identification, such as provided by personal identifier.

In an exemplary embodiment is a method and system for speaker identification in a multi-party unidirectional setting where there may be two or more potential speakers and the need to securely capture the utterance of each speaker with an accuracy of attribution. In this scenario, speaker identification is the process by which speaker input from a microphone 95 sensor is captured, filtered and recorded in a memory 74 (storage) of the device. Filtering removes all but the faintest of background noises ensuring capture of the spoken utterance with minimal noise and to assure that captured is the utterance of the first user. Such capture process results in snippets of audio in digital format. Typical snippet size is in the three to five-second range though deviations are possible. Each snippet is bounded by breaks in the spoken word established by recognizing the speaking cadence of the first user. Multi-party applications such as described operate in session segments wherein a moderator person or device initiate the session by sending a personal identification query message to the personal identifier of each person taking part in the session. Receipt of this query message begins the speaker identification process in each personal identification device. As the session progresses possession status of the personal device is monitored, and if found to be in possession of the first user then snippets are captured, analyzed for source recognition and attributed to the first user when such attribution is established. Snippets are then concatenated with the probability of possession status, message accountability, device identifiers, the unique session identifier token received with the original query and the snippet audio data thereby creating a Personal Identification Code message. That message with or without encryption is transmitted to the moderator device. Transmission may be by any suitable network means such as Bluetooth, Wi-Fi or Internet. The snippets received by the moderator are processed as called for by the application with the assurance of full accountability In another embodiment is a method and system for speaker identification in a single-party bidirectional command and control like application. In an application of this nature, a user has voice control of a system, process, or device without risk of impersonation. In response to a query for possession status and voice message the personal identification device validates possession status, and if that indicates possession by the first user then user utterances are captured, the audio data process and the results assembled into a snippet. The snippet is then combined with possession status probability and unique session identifier token included with the query and device identifiers to produce the personal identification code. That code, encrypted or not, is then transmitted over suitable networks such as Bluetooth, Wi-Fi, Internet, cellular or other to the control device making the query. In this way the query device is provided with absolute assurance the utterance received is from the first user and no one else.

A system or device charged with authentication of a user by use of their personal identifier device is necessarily remotely located from that device and therefore must communicate with it via available networks. The personal identifier device may employ support for any number of different types of networks. A present-day mobile cell phone, for instance, would typically have three such networks available, the cellular network, the Wi-Fi network connecting to any number of different network topologies and Bluetooth near-proximity networks. Other options suitable for authentication by use of personal identification device may exist now or in the future such as quantum network and entangled particles, all indistinguishable so far as the present invention is concerned.

Employing the use of networks for remotely verifying a person is who they claim to be even when identification accuracy is assured by the personal identification device being used risks intervention by bad actors in what is referred to as man-in-the-middle attacks. Such an attack involves interception of network traffic and then altering or misusing that traffic to affect the outcome of the user authentication process. Most often, the purpose of the attack is to impersonate the user, thereby granting access to the bad actor.

Heretofore encryption has been relied upon to protect from the man-in-the-middle attacks. The advancement of technology for the good of man, unfortunately, at the same time fattens the bad actor's tool chest with new and novel ways to defeat encryption.

Present-day symmetrical or asymmetrical encryption can, given the time and material to work with, be cracked. Such cracking is facilitated by the technologies used and the methods of use for user authentication. Methods of use are repetitive, thus giving the man-in-the-middle attacker an unlimited number of samples to work to analyze in their efforts to reverse engineer the encryption algorithms. This combined with the almost limitless computation power available to the bad actor by use of pirated network computers operating in parallel makes defeating the ciphers all but assured. Added to this is Quantum Computing now on the near horizon and its ability to crack any cipher in minutes if not less. It's likely bad actors will be among the first users of quantum computing technology for this very application.

There is one cipher technology known to be safe, the One-Time Pad cipher. The one-time nature of this technology is a major contributor to its being hard to compromise. The attacker who manages to intercept a message encrypted using this technology gets exactly one sample to use in their reverse engineering efforts. There are other hurdles the attacker must also overcome, such as time. For encrypted network traffic, the time to live of the encrypted message is measured in milliseconds or less. This thwarts the attacker's efforts to reverse engineer the cipher even if using quantum computing. Unfortunately, the very nature of the One-Time Pad cipher that makes its use so secure is also that which prevents its use on all but the most limited of applications.

The present invention recognizes the man-in-the-middle vulnerability manifested by all but one known network scheme. It likewise recognizes the risk of repetitive use of the same symmetrical or asymmetrical cipher keys.

As with any user identification scheme, the user and their identifier must go through a registration process by which the personal identification device and First User become known to the identity verification process, the Inquisitor.

In the present invention is disclosed an additional component of this registration process, provision of the Inquisitor with a Next Query Seed and a Next Response Seed, the seeds produced by the personal identifier device. A One-Time Pad cipher key for query and response messages are produced from the randomly generated seeds provided by the personal identification device. Use of the self-generated One-Time cipher keys for encryption of request query messages and decryption of their responses assures that even in the event of bad actor infecting the identification network with a man-in-the-middle bot, the communications remain secure.

In operation, the inquisitor encrypts the possession status request query message using the One-Time Pad cipher key generated from the Next Query Seed. The personal identifier decrypts the possession status request query message using its self-generated One-Time Pad cipher key likewise produced from Next Query Seed. Production of the personal identification code is expanded to include new query and response seeds. The personal identification code message is, after being encrypted using a One-Time Pad cipher produced from the Next Response Seed, sent over networks to the Inquisitor where after decryption by use of a One-Time Pad cipher produced from the Next Response Seed the message is processed. The newly supplied seeds become the Next Query Seed and Next Response Seed. This method of One-Time Pad cipher generation and use offers some additional levels of security such as forcing re-registration by First User and their personal identification device in the event, though unlikely, the Inquisitor should detect tampering.

In another embodiment, a method of remotely verifying the user of a device is disclosed including, monitoring sensors of the device over a period of one or more days during use by a first user of the device, therefore, learning of human traits of the first user of the device.

Sending a possession query from a remote computer system to the device and receiving the possession query by the device. Responsive to the possession query, the device reading data from the sensors of the device and the device determining a probability that a person having possession of the device is the first user by using the data in view of the human traits and sending the probability to the remote computer system.

BRIEF DESCRIPTION OF THE DRAWINGS

The invention can be best understood by those having ordinary skill in the art by reference to the following detailed description when considered in conjunction with the accompanying drawings in which:

FIG. 6 illustrates an exemplary program flow during a learning mode of the personal identification system.

DETAILED DESCRIPTION

Figure 1:
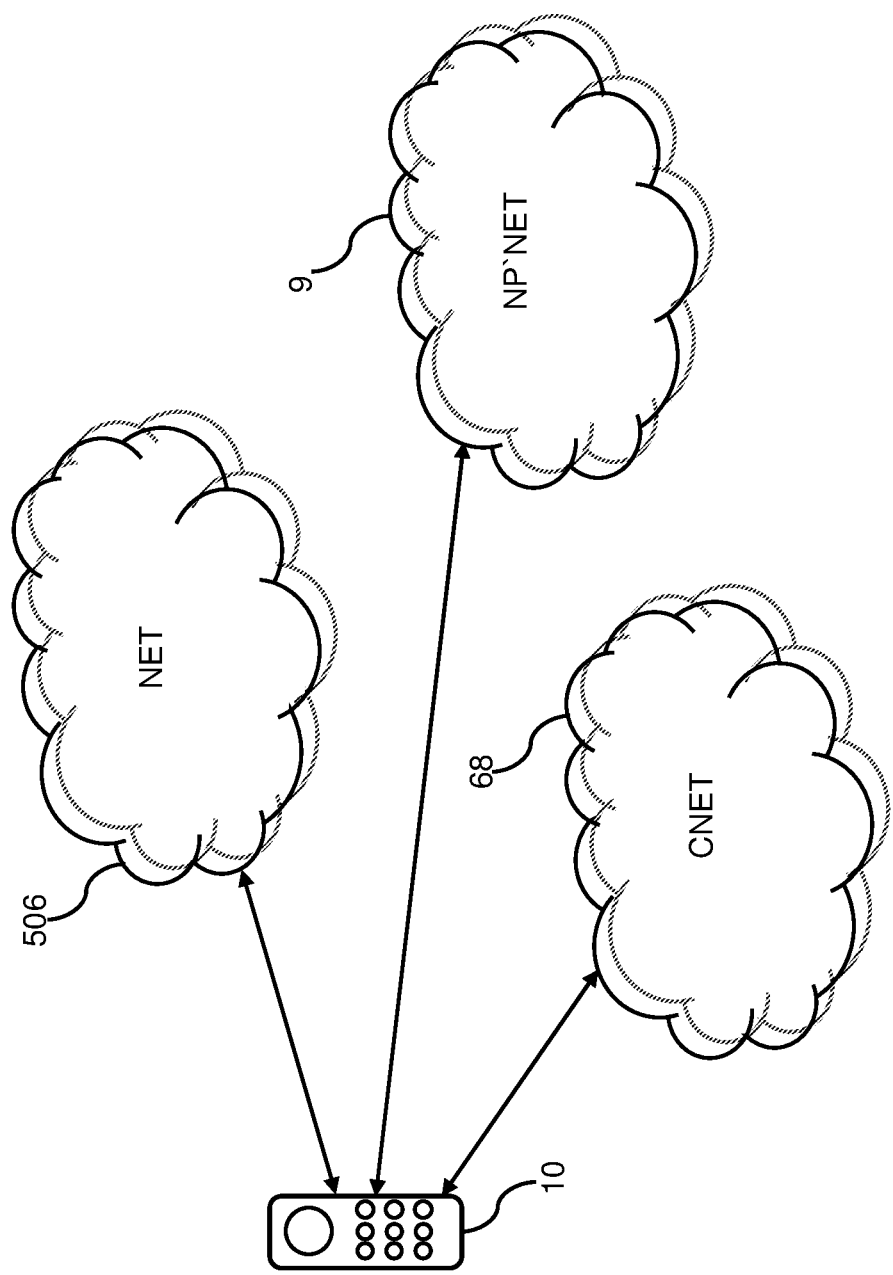
FIG. 1 illustrates a typical cell phone in various modes of communications associated with multiple networks, including cellular, local, wide, and near proximity area networks.

Reference will now be made in detail to the presently preferred embodiments of the invention, examples of which are illustrated in the accompanying drawings. Throughout the following detailed description, the same reference numerals refer to the same elements in all figures.

Before getting into the details of this invention it is necessary to disclose terms used and their meaning herein.

Under the umbrella of physiological human traits are those of emotion. An individual's emotional traits may not directly lead to that person's identity but knowing the emotional state of the individual is a contributing factor. Each person exposes in their facial expressions, speech and textural utterances, movements and device motions what the present invention categorizes as the first users "normal" and "public" emotional and stress level states. Once these states are recognized and learned then emotional, and stress-related shifts are detectable from deviations from these norms. By categorization such, these recognized emotional shifts are assigned to either of a small set of states. Of these is the "public" state and the "normal" state, states that need not be the same. The six other recognized states include happiness, sadness, fear and surprise, anger and disgust. Of these, fear and surprise may be intermixed or combined as would anger and disgust as these pairs share common expressions and speech patterns. It's important to distinguish the disclosure of facial expressions of the present invention from the prior art of facial recognition where passive expression is the normal requirement. Indeed, no emotional state can be concluded from the passive expression employed by some prior art.

Emotional states are detected, learned, and projected by the primary sensory inputs from a camera 93 and a microphone 95. Secondary sensory inputs augmenting the primary are realized from a touch screen 92 with display 86, an accelerometer 8, a gyroscope 11, a compass, a magnetic sensor 12, orientation, rotation, and others. Facial expressions are captured by camera 93 and processed by analytics methods to identify and categorize the facial expression into any of the six types or to discard as not indicative of any. Again, not to be confused with facial recognition, in this, the camera of the present invention is employed to capture facial images to discover an emotional state of the user, an action that may be undertaken without user awareness. Sound analysis of the raw audio signal by use of sound analytics methods is used to identify and categorize the recognized expressions into any of the six types. Sound analysis includes but is not limited to tonality, pitch, loudness, level, fundamental frequencies, voice quality, and signal timing. Transcripts of the spoken words are also analyzed, where possible, for cadence, separation, and white space to recognize the presence of any of the six emotional states of interest. Device usage, including physical aspects of rotation, orientation, and vibration as well as textual content, is analyzed to discover indications of any of the six emotional states of interest. Organizing these various recognizers into priority order of facial, sound, spoken words, physical device motions and textual content reduces potential from false positives.

Invariably there will be times when IDTRAITS alone do not conclusively rule the user who is presently in possession of the device either in or out. Resolving this indecision is accomplished by use of a PIN, more specifically a Smart PIN or security PIN as used herein. Briefly, the security PIN is a PIN like string of characters the first user provides initially during the machine learning phase, a string known only to the personal identification device and the first user. It's different from the more well known four character PIN in that there is no length limit, characters may be either numeric or alphabetic, character input is done via the touch screen of the device and most importantly, the biometrics of the string input are validated in addition to the characters and their order. The biometrics component of matching is principal distinguishing characteristic difference between the security PIN and the historical PIN.

An inherent weakness of credentials-based identification is its dependency on the singularity of binary matching. The credential proof of identity presented by a person seeking access must match exactly the baseline proof in possession of the entity making the match, a singular event with a singular binary result. Realizing the difficulty of use this method can produce the implementers of such methods often allow for retry on binary false results and with repeated failures resulting in use of the "reset password" option. Identification by use of human traits as proposed by this invention replaces the singularity of the credential by the multiplicity of human traits and within this set, a realization a trait is not a binary but rather itself has a multiplicity of representations. It is exactly this "fuzzy" basis of human traits that eliminates the potential of spoofing. To facilitate the fuzzy nature of human traits in the process of absolute identification, the embodiments of this invention embrace matching circuits that do exactly that. For this reason, throughout this document there is reference made to AI, Artificial Intelligence, and the NN, neural networks, of AI for the purpose of fuzzy matching, the results of which represent a probability of truth. For example, a probability greater than 91% is considered in most embodiments as the "true" state. The term "fuzzy" is also used herein to add fuzziness to otherwise thought to be absolute values. For example, the absolute value of true north is 0 degrees. The fuzzy north, on the other hand, might be a range between 331 and 28 degrees where any compass reading within that range is considered north, the fuzzy north.

The binary nature of credentials-based identification enables use of BOTs to mimic the presence of a human. A BOT is a piece of computer software whose purpose is to robotically mimic human activity. A BOT installed on a user smartphone or laptop as a result of a successful phishing attack can mimic the user of the device. For example, when the user is not present the BOT can logon to their bank account presenting both user name and password as per normal, from the banking system point of view. This BOT then initiates a wire transfers of the account balance to an untraceable bank account. The professionally implemented BOT then wipes itself out leaving no trace of its ever having been present on the users device. In this way the BOT facilitates yet another perfect crime.

A very difficult to detect and prevent form of cyberattack is the Man-In-The-Middle (MITM) attack. These attacks are especially effective where credentials-based identification is used in online transactions. In this attack the BOT, as described above, is planted by successful phishing attack between the user access facilities and the service provider that authenticates user credentials. As such, the BOT becomes a man in the middle or MITM with the ability to monitor all activities between user and, for example, that banking system. Being so located the MITM BOT can hijack user credentials either passing those off to a different proxy system where the credentials can be used by a cybercriminal to access the user's accounts thereby impersonating the user. Or, as described above, the MITM BOT can then use those credentials to mimic the user for the purpose of flushing their back accounts. MITM BOTs are nearly impossible to detect once implanted and phishing attacks are only slightly more likely to be prevented. It is therefore an invention proposition of this application that avoidance is the most effective defensive strategy. Avoid the MITM altogether where possible and in all other cases disarm the MITM when implanted thus rendering it impotent.

In recognition of the near impossibility of preventing phishing attacks and thus the risk of BOT deployment, the present invention puts a focus on mitigation. When best efforts fail and a MITM BOT is deployed the next best defense is to prevent it from harvesting usable data. To achieve this the present invention discloses the Unique Session Identifier token concept and its unique associated cryptography methods. The unique session identifier token is a simply a small token, perhaps a UUID (Uniquely Universal Identifier), produced by the service provider acting as the relying party for each authentication session. Hence, a unique session identifier token identifies with just one authentication session. Prior to initiating the session, a unique session identifier token is created and encrypted. It is then sent to the personal identifier device of the requesting party, said device having been previously registered with the service provider. Personal identifier upon receipt of the token, validates it, signs it, encrypts it and then forwards it back to the service provider. There the signed token is verified and if valid then authentication is affirmed, and access allowed. Use of multiple networks in this process, as outlined elsewhere herein, limits the MITM's BOT to access. Even if the MITM BOT should come into possession of both signed and unsigned copies of the token, they are encrypted thus preventing or limiting access to the token in the raw. Of course, there is a possibility the pirated encrypted token is eventually deciphered to reveal the private key used thus allowing spoofing of the unique session identifier. To thwart this possibility the present invention reveals use of pairs of asymmetric cypher key pairs in a way that mimics the nature of the One-Time Pad key thus making it impossible to decipher the key.

The holy grail of cryptography is the One-Time Pad. Messages encrypted using One-Time Pad cannot be cracked by any means now known to man, not by raw computing power, not by Quantum computing power and not by the supposed power of AI. An inherent problem with using One-Time Pad keys One-Time Pad key is message length. The unique session identifier token as revealed herein is of a length that makes use of One-Time Pad encryption possible by insuring the message is equal to or less than the length of the One-Time Pad key. Another inherent problem is that both the originator and the recipient must know the key and the key can be used exactly once thus presenting the problem, how to generate a new key and communicated it securely to the other party. The present invention addresses these and other problems of the One-Time Pad thus enabling it's use.

The invention relies on the use of a plurality of IDTRAITS. Throughout this description reference to the term "trait", "human trait" or "habitual trait" shall be construed as a reference to any of the following types of traits as they relate to those of the human: air temperature, air pressure, relative humidity, location (latitude, longitude and altitude), motion (direction, speed and mode), cellular device (towers), device orientation, time (millisecond, time of day, day of week, day of year), scene, waking hour, retiring hour, touch (tap, swipe, number of fingers, finger size, pressure, duration, direction, speed), voice signature, handedness, favored ear, gender, age group, heart rate, glucose level, blood pressure, blood o2 level, emotions, hair color, skin color, iris scan, eye size, eye spacing, texting patterns, calling patterns, email patterns, internet usage, social media patterns, social media usage, significant motion, stationary, human position, mobility step, mobility pace, mobility stride, mobility speed, mobility distance, mobility mode, finger print, palm print and retinal scan.

Measurable values of human traits as recognized by the invention are produced by the use of electrical circuits referred to throughout this description as "sensor" or "sensory." Production of measurable values of human traits is dependent on inputs from one or more of the following types of sensor circuits: accelerometer 8, ambient temperature sensor 16, gyroscope 11, heart rate sensor 18, blood pressure, glycosometer, oximeter, weight scale, ambient light sensor 14, IR (infrared light), magnetic sensors 12, atmospheric pressure sensor 15, proximity sensor 13, relative humidity, device temperature, touchscreen, camera front, camera back, microphone 95, cell tower, GNSS (GPS, GLONASS, Galileo), UV (ultraviolet light), GFR (galvanic skin response), human temperature, respiration, hydration, motion (three degrees of freedom or six degrees of freedom) and DNA.

Throughout this description, the term "possession" means "in possession of" as a state of having on or with one's person.

Throughout this description, a cell phone is used as an example of a device, though any electronic device, typically a processor-based device, is anticipated such as a mobile device having a minimal hardware composition of a primary network transceiver inclusive of a subscriber identity module (SIM) with unique network identifier, a secondary transceiver of the personal area network type such as Bluetooth having a unique identifier (BD_ADDR) address, a storage medium and a human user interface. The device would also incorporate one or more sensor circuits all of which provide inputs that are used by the disclosed software system and methods to produce measurable values representing a plurality of human traits that uniquely identify the first user of the device and are used to determine if the present user of the device is the first user of the device.

Throughout this description, the term, "first user" is used to describe the person who owns or is assigned the device. It is anticipated that multiple incarnations of the present invention on the same mobile device are used to accommodate situations where a mobile device has more than one assigned user.

The personal identification system 102 (see FIGS. 3, 4 and 4A) determines a probability that the person in possession of a mobile device (e.g., a cell phone) is a person that is known to the device (e.g., the "first user"). Such determination is based upon foreknowledge acquired by the personal identification software system, the human traits as they relate to the first user. Such traits, preferences, habits, etc. are represented in the form of data, for example, as is acquired from a neural network training session. The trait data artifacts such as neuron biases and weights are saved in a first user's knowledge base thus creating a first user trait profile during a machine learning process. During the initial machine learning period of several days and continuing in perpetuity thereafter artifacts of the first users behavioral biometrics are captured and recorded from time to time thus creating within their profile a timeline of human trait events.

The probability that the device is in possession of the first user is derived through first and second level predictive processes. During these predictive processes, in some embodiments, refinements are made to a first user's trait profile within the knowledge base to improve the accuracy of the first user's trait profile by elongation and by refinements to comparator seeds, thus capturing lifestyle changes.

For example, neuron weight and bias settings are updated in the case where neural networks are employed for memorization and comparing.

In some embodiments, proof of identity logic is triggered during the first level predictive process when the resulting probability indicates ambiguity. For example, if the user in possession of the device cannot be affirmed with high probability, a request is presented to the user in possession to provide proof of identity, possibly from a plurality of proof types, receipt of which is compared to stored responses resulting in a determination the user in possession of the device is the first user, or is not the first user as identified by the first user trait profile knowledge base.

In some embodiments, a reporting task is provided by which the output, a personal identity code, is made available to inquisitors.

Therefore, one embodiment will indicate to an inquisitor the possession status of the device as being in possession of the person identified in the first user knowledgebase or possession of someone other than the person identified in the first user knowledge base. The inquisitor receiving a personal identification code indicating the person in possession is the first user and by knowing the person the device is assigned to is the queried device is assured the person is who they claim to be without risk of the person in possession being any other person in the world.

In FIG. 1, an exemplary data connection diagram of the personal identification system 102 is shown. The personal identification system 102, for example, operates on an end-user device (e.g., cell phone 10) to monitor usage and determine if the device (e.g., cell phone 10) is in possession of the first user.

In the example shown the cell phone, 10 is in communications with the cellular network 68 and Internet 506 by Wi-Fi transceiver and in communications with another network 9, for example, Bluetooth or other RF technologies. An inquisitor seeking to confirm the identity of the person in possession of the device may employ the use of either or all networks to retrieve the current personal identity code. Also, the use of any network can be for the purpose of accessing sensory devices employed in the capture and development of measurable values indicative human traits.

Figure 2:
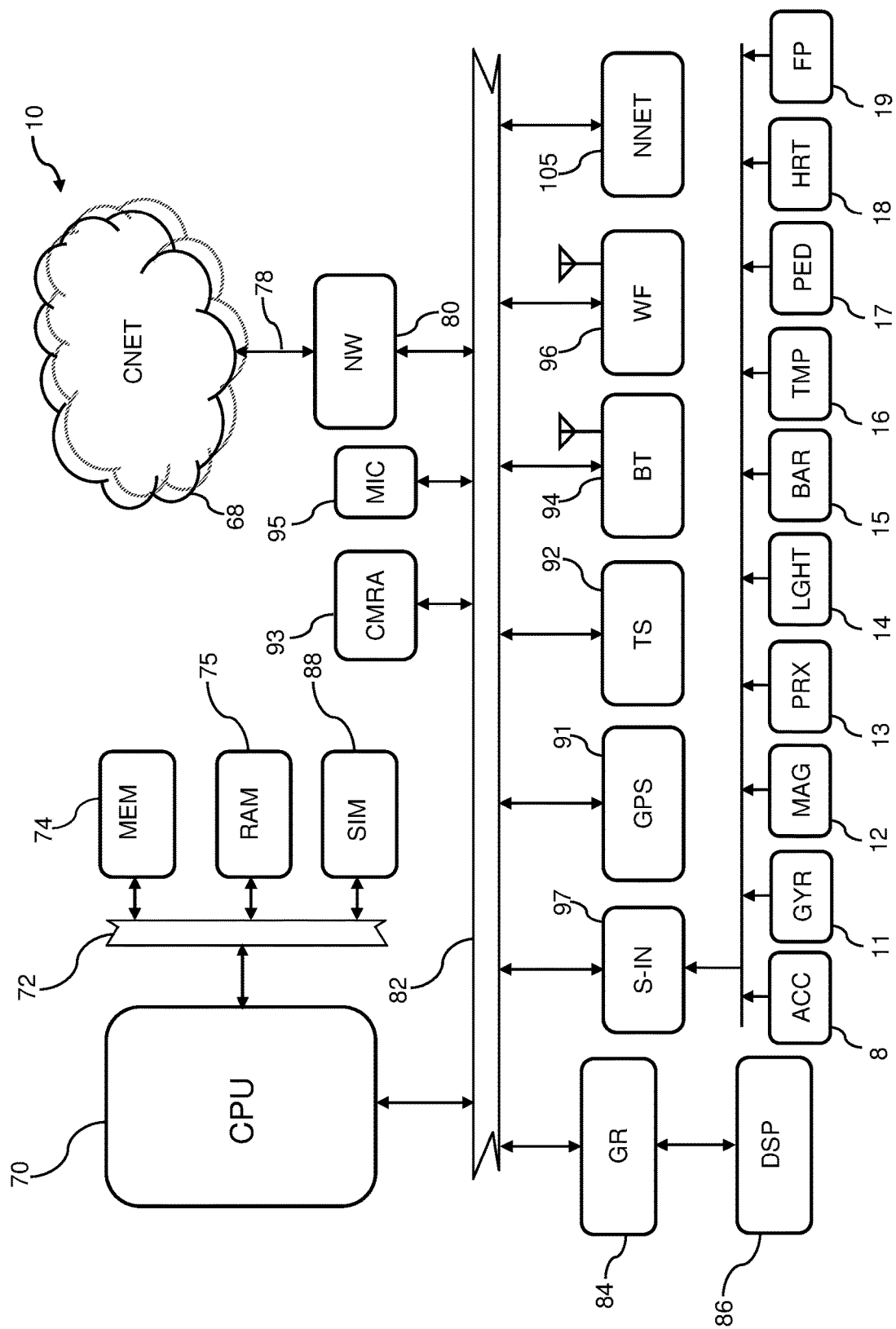
FIG. 2 illustrates an exemplary cell phone.

Referring to FIG. 2, a schematic view of a typical device, a cell phone 10, is shown. Although any device(s) is/are anticipated, for clarity purposes, a cell phone 10 will be used in the remainder of the description.

The personal identification system 102 is described operating within and, possibly protecting a processor-based mobile device (e.g., cell phone 10) providing for determining if the mobile device (cell phone 10) is in possession of the first user of the device. Again, although a cell phone 10 is used in the description, the present invention is in no way limited to using a cell phone 10 as any computational device (typically processor-based and portable, but not required to have a processor) is anticipated (e.g., a mobile device having minimal facilities as afore described, a tablet computer, an e-reader).

The example cell phone 10 represents a typical mobile device, one which the personal identification system 102 operates. This exemplary cell phone 10 is shown in its simplest form. Different architectures are known that accomplish similar results in a similar fashion, and the present invention is not limited in any way to any particular cell phone 10 system architecture or implementation. In this exemplary cell phone 10, a processor 70 executes or runs programs loaded in a random-access memory 75. The programs are generally stored in persistent memory 74 and loaded into the random-access memory 75 when needed. Also, accessible by the processor 70 is a SIM (subscriber information module) card 88 having subscriber identification encoded there within and often a small amount of persistent storage. The processor 70 is any processor, typically a processor designed for cell phones 10. The persistent memory 74, random-access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, the capacity of memory suitable for persistently storing data, for example, flash memory, read-only memory, battery-backed memory, etc. In some exemplary cell phones 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch-screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, and data, etc. In some embodiments, other data is stored in persistent memory 74 such as audio files, video files, text messages, etc.

The peripherals are examples, and other devices are known in the industry such as Global Positioning Subsystem 91, speakers, USB interfaces, cameras 93 (front and back facing), microphone 95, Bluetooth transceiver 94 having a unique Bluetooth network address (BD_ADDR), Wi-Fi transceiver 96, accelerometers 8, gyroscopes 11, magnetic sensors 12 (e.g. for directional sensing), proximity sensors 13, ambient light sensors 14, atmospheric pressure sensors 15 (e.g. barometric), ambient temperature sensors 16, pedometers 17, heart rate sensors 18, fingerprint readers/sensors 19, etc. and including any sensor capable of producing a value indicative of a trait within IDTRAITS, the details of which are not shown for brevity and clarity reasons.

The cellular network interface 80 connects the cell phone 10 to the cellular network 68 through any cellular band and cellular protocol such as GSM, TDMA, LTE, etc., through a wireless medium 78. There is no limitation on the type of cellular connection used. The cellular network interface 80 provides voice call, data, messaging services as well as Internet access to the cell phone 10 through the cellular network 68.

For local communications, many cell phones 10 include a Bluetooth transceiver 94, a Wi-Fi transceiver 96, or both and some cell phones support other network schemes as well, such as including near-me and body area networks. Such features of cell phones 10 provide data communications between the cell phones 10 and data access points and/or other computers such as a personal computer (not shown) as well as access to other types of sensors that may be employed as part of the first user identification process.

The personal identification system 102 is anticipated to be implemented in hardware, software, or any combination thereof.

The personal identification system 102 detects and learns human traits of the device's owner or assignee (herein, first user) employing any combination of inputs and sensory devices such as 10/11/12/13/14/15/16/17/18/19/20/93/95, including, but not limited to, accelerometers 8, gyroscopes 11, magnetic sensors 12, proximity sensors 13, light sensors 14, atmospheric sensors 15, ambient temperature sensors 16, pedometers 17, heart rate sensor 18, fingerprint sensors 19, cameras 93, microphones 95, Global Positioning System (GPS/GNSS) receivers 91, etc. Further inputs to the personal identification system 102 include detection of cell tower related information, detection and strength of other devices within range, and user-interface inputs. During the monitoring process, the personal identification system 102 receives inputs and calculates a probability of the device being in possession of the first user and not being in the possession by someone other than the first user.

The inputs and sensors listed above (inputs and sensory devices 8/11/12/13/14/15/16/17/18/19/20/93/95) are examples as the present invention is anticipated to work with any possible input or sensory device to measure and detect how and where the rightful owner uses the device, including inputs and sensors that are not currently available on certain devices but become available in the future.

One example of using a sensory device is using a camera 93. As the user holds the device and looks at the display, the user is also looking into the camera 93 (front-facing) of the cell phone 10. Being such, the personal identification system 102 has access to the camera and the ability to periodically capture an image of the current user and, using for example facial recognition or iris recognition, the personal identification system 102 records data regarding the current user, then when personal identification system 102 is called upon to determine the probability that the current user is the rightful owner, this recorded data feeds into the resulting probability with a certain weight, likely a high weight. So, in very high-level terms, if the rightful owner has eyes that are blue and relatively close to each other and the current user has eyes that are brown and somewhat distant from each other, the image captured from the camera 93 will be a factor in generating a low probability that the device is in possession of the rightful owner.

In some embodiments, the personal identification system 102 is implemented entirely in software. In these embodiments, the personal identification system 102 is loaded into RAM 75 and executed by the processor 70, monitoring sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), reading and storing data in the persistent memory 74. The personal identification system 102 learns information about the first user by gathering learned data from a plurality of sensory inputs used to produce measurable values representing human traits for a period or until sufficient data is obtained to determine later if the cell phone 10 is in possession of the first user. The learned data is stored as a first user knowledge base, for example, in the memory 74 and later used by the personal identification system 102 to calculate a probability that the cell phone 10 is in possession of the first user. An example of such traits is which hand the user holds the cell phone 10, a sequence of usage of applications run on the cell phone 10, keying speed, keying accuracy, typical keying errors, etc.

In some embodiments, the personal identification system 102 is implemented partially in software and partially in hardware using a hardware accelerator 105 such as a hardware-implemented neural network. In these embodiments, the software portion of personal identification system 102 is loaded into RAM 75 and executed by the processor 70, monitoring sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), reading and storing data in the persistent memory 74. The personal identification system 102 learns information about the first user by gathering learned data from a plurality of human traits for a period or until sufficient data is obtained to determine later if the cell phone 10 is in possession of the first user. The learned data is stored as a first user knowledge base, for example, in the memory 74 and later presented to the hardware accelerator 105 by the personal identification system 102 software to calculate a probability that the cell phone 10 is in possession of the rightful owner.

As anything that is implemented in software is capable of being implemented in hardware/logic, in some embodiments, the personal identification system 102 is implemented entirely in hardware using a hardware accelerator 105 having a controller such as a hardware-implemented neural network with processing. In these embodiments, the hardware accelerator 105 with processing monitors sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), reading and storing data in the persistent memory 74 or in memory local to the hardware accelerator 105 with processing. The personal identification system 102 learns information about the first user by gathering learned data from a plurality of human traits for a period or until sufficient data is obtained to determine later if the cell phone 10 is in possession of the first user. The learned data is stored in a first user knowledge base, for example, in memory local to the hardware accelerator 105 or in the cell phone 10 memory 74 and later read by the hardware accelerator 105 with processing to calculate a probability that the cell phone 10 is in possession of the rightful owner.

At the core of the present invention exists a first mathematical function that can be trained using a first set of inputs such that parameters of the first mathematical function when applied to a second mathematical function enable the second mathematical function to process a second set of inputs producing a value indicative of probability of likeness of the second set of inputs to the first set of inputs. One such mathematical function suitable for this purpose is that of the Neural Network taken from the science of Artificial Intelligence.

Figure 5:
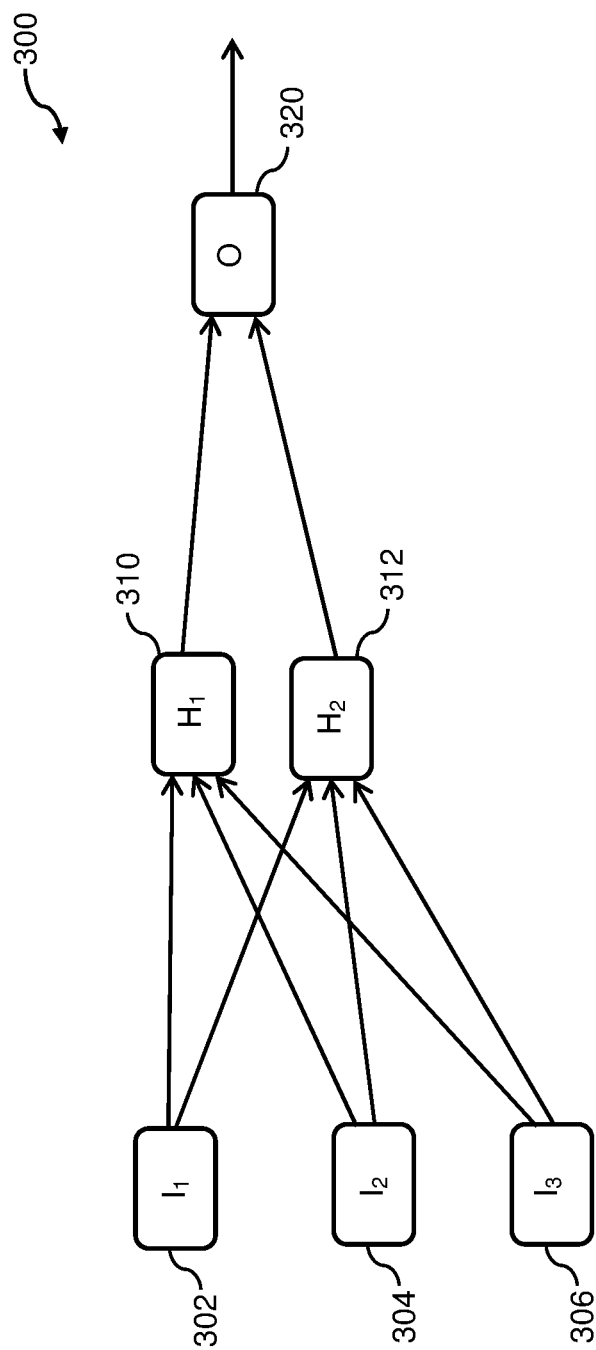
FIG. 5 illustrates a three-input feed-forward neural network having two hidden neurons.

Referring to FIG. 5, an exemplary implementation of the personal identification system 102 within which a mathematical process 300 represented by a simplified multilayer feed-forward neural network is depicted. During a learning process, iterative sampling of sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), etc., are processed by the neural network in training mode over a period of sufficient duration to, in effect, learn the sensory input values. For each iteration, input values are fed into 302, 304 and 306 neurons with adjustments being made to weights and biases of hidden neurons 310 and 312 based on deviations between the output value of neuron 320 and desired sample output. The iterative process is repeated using newly captured sensory inputs with continued refinements by use of error function feedbacks being applied to hidden neuron weights and biases. After the multi-iteration cycle, the accumulated hidden neuron weights and biases are saved to a knowledge base as a dataset aligned to time such that the collection of saved datasets represents a timeline of sensory sampling events. During a subsequent predictive process newly acquired sensory inputs are fed into input neurons 302, 304 and 306 of a neural network that was provisioned with a dataset of weights and biases taken from the knowledge base timeline relative to the same time period with the resulting output value from neuron 320 representing a value between 0 and 1 that represents the probability the newly acquired sensory inputs are like or similar to the original set of sensory inputs employed to learn and create the knowledge dataset.

Figure 3:
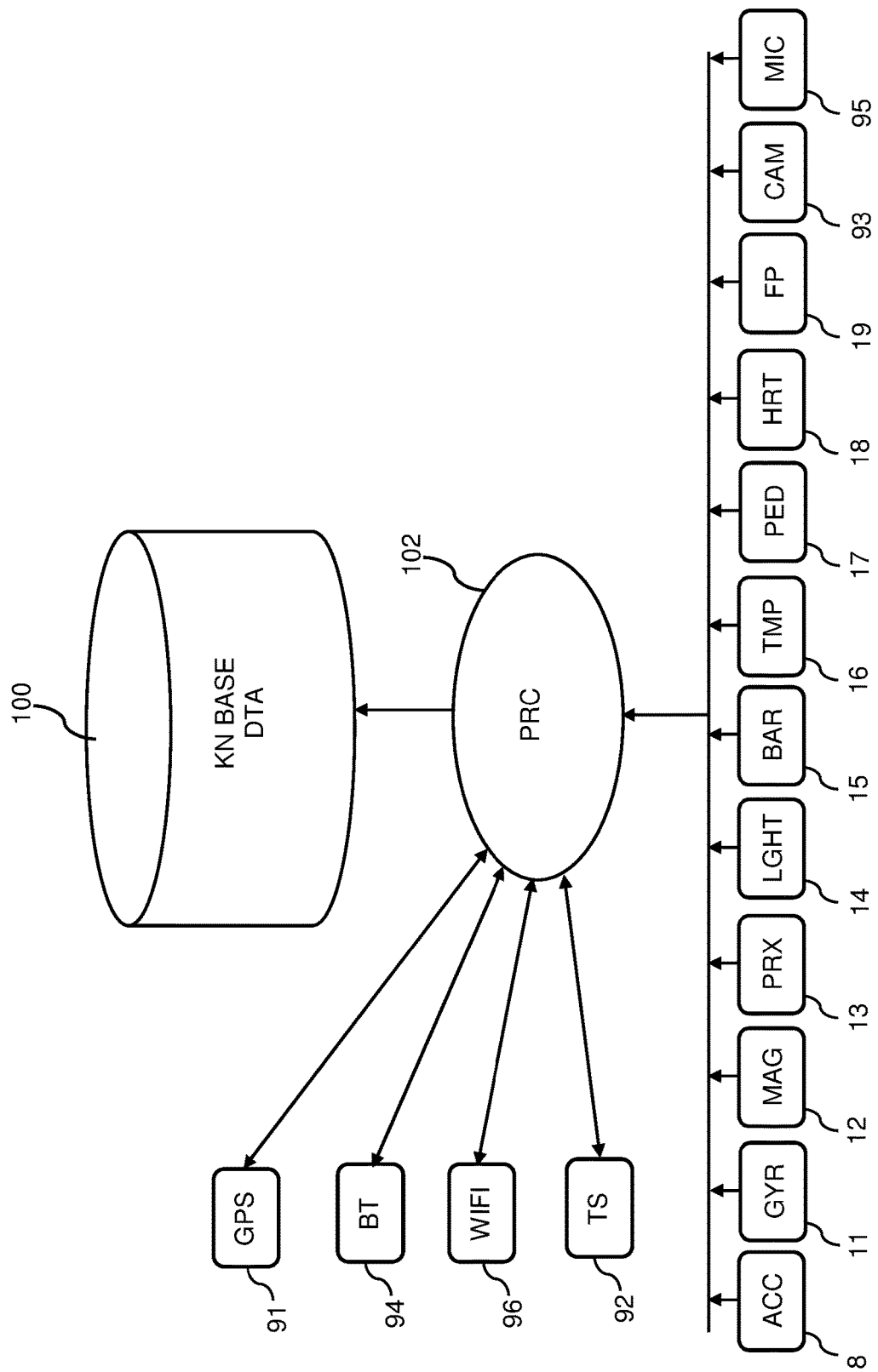
FIG. 3 illustrates a learning mode of the personal identification system.

Referring to FIG. 3, a schematic diagram of the personal identification system 102 operating in the training and learning mode is shown. The personal identification system 102 monitors one or more sensory input devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g. touch screen interface 92), etc., gathering data during the training and learning mode and storing the data in a knowledge base 100 (e.g., the knowledge base is stored in the persistent memory 74). The training and learning mode is anticipated to be executed as an iterative process for a period of time (e.g., two weeks, 10 days), or the training and learning mode is anticipated to gather data into the knowledge base 100 until the personal identification system 102 has sufficient data as to reliably determine if it is in possession of the first user.

Each embodiment of the invention implements support of a plurality of human traits suitable to meet the requirements of reliable and accurate first user identification. The training and learning mode are carried out independently for each human trait such that there is a separate first user event timeline dataset for each human trait within a common knowledge base. Each event dataset is aligned to a period in time, such as the period of 8:00 through 8:04 the morning of the third day of the week and includes data representative of sensory inputs learned during that period. Additional dataset periods are assembled as a timeline of dataset events such that, for example, for a given day of the week there would be a dataset for the period of 8:00 through 8:04 and another dataset for the period of 8:05 through 8:09 and so on.

As explained, each learned event dataset contains information related to a first mathematical process in a form and format suitable to provisioning a second mathematical process like that of the one used to create the data of the dataset. However, newly acquired sensory values input to the second mathematical process produces a second value output indicative of likeness of the second value to the value employed to create the dataset. In other words, a probability of likeness.

Referring to FIG. 6, an exemplary program flow indicative of training and learning mode of the personal identification system 102 is shown. The training and learning mode begin with an initialization step 200, which, among other things, initializes the knowledge base 100. In some embodiments, this initialization process may include a collection of first user credentials such as password, PIN, secret phrase or a biometric such as fingerprint, palm print, voice or sound signature snippet, retinal scan or other such secret identifiers known only to or produced by the first user. The number and type of human traits to be employed are provisioned to the knowledge base with each including the human trait type, initial probability of possession by the first user of 0.999, a probability of possession factor depletion value and both the positive and negative probability of possession weighting factors. A training and learning mode process are then initiated for each of the embodiments human traits with the remainder of the training and learning mode being identical for each of the human traits of the embodiment.

For each human trait, the training and learning mode continues in an iterative loop wherein each iteration is initiated by sensory input event or timer at 202 followed by capturing inputs from one or more sensory devices 8/11/12/13/14/15/16/17/18/19/20/93/95, Global Positioning System (GPS/GNSS) receivers 91, Wi-Fi transceivers 96, cellular network transceivers 80, Bluetooth transceivers 94 and input devices (e.g., touch screen interface 92), etc. As new sensory data are captured 202, the sensory data are processed 206 by use of mathematical process 300 after which stint ending event 208 is evaluated and if false, returns to wait for the next sensory event 202. The duration of a stint is a function of the type of human trait being learned. On the stint conclusion store 204 mathematical process artifacts to the knowledge base 100 and then evaluate if the training and learning period has completed 214.

Completion test 214 is performed to determine if the learning mode is complete. The completion test 214 is, for example, a passing of an interval of time (e.g. 15 days), gathering of sufficient knowledge data in knowledge base 100, a passing of a sufficient number of usage time (e.g., the cell phone 10 was used for 40 hours), a test to see if the personal identification system 102 can determine if the user of the cell phone 10 is the first user, etc. If the completion test 214 determines that the learning mode is complete, the learning mode ends. Otherwise, the loop continues with waiting for the next sensory event 202 (or timeout).

Figure 4:
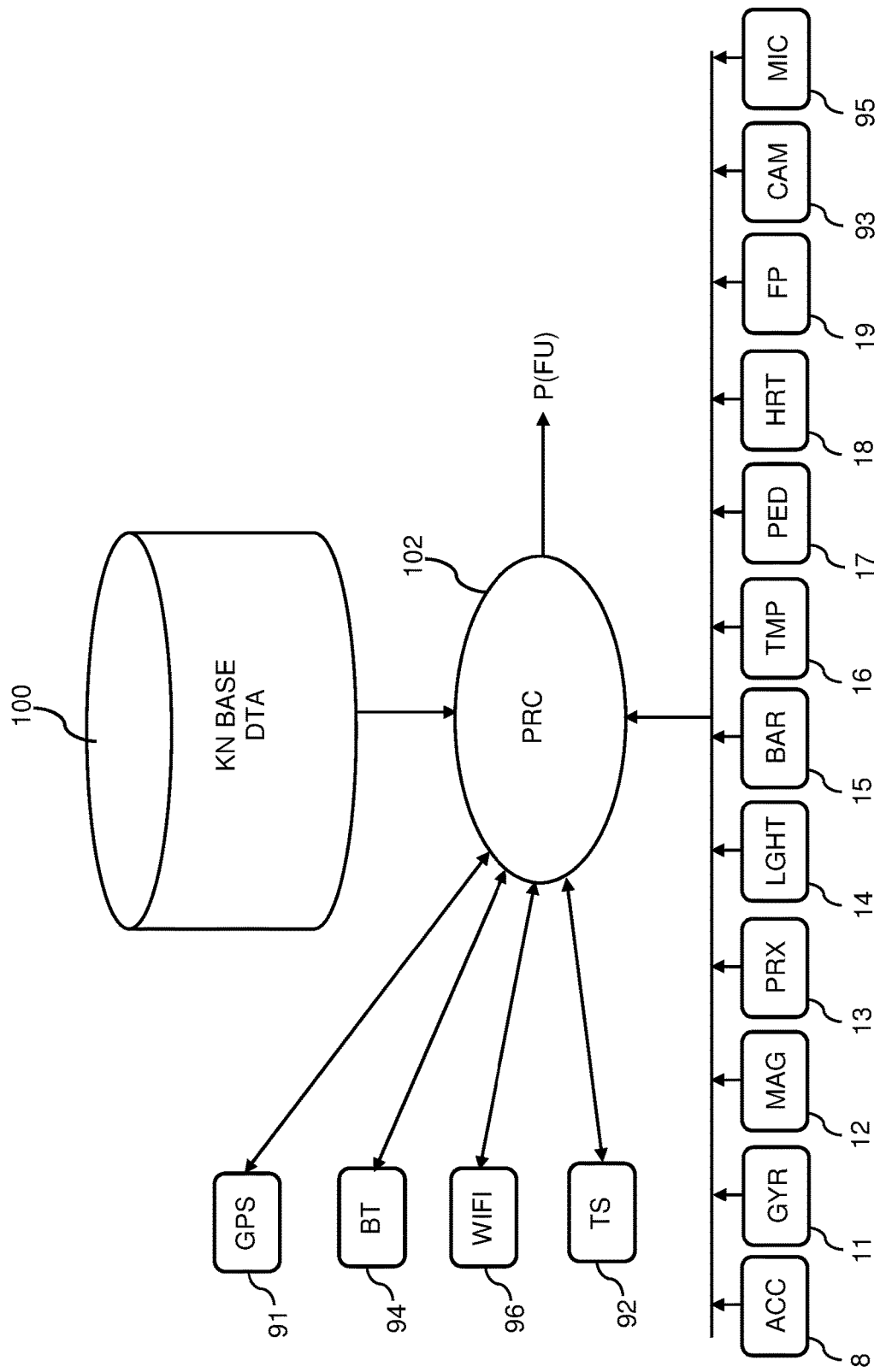
FIG. 4 illustrates a usage mode of the personal identification system in first level predictive mode (P(RO) to P(FU)).

Referring to FIG. 4, the first level prediction mode will be described. The first level prediction mode is performed iteratively and as an independent task for each human trait of the embodiment. The first level prediction mode calculates a probability factor of a single human trait indicating the likelihood that human trait of the present user of the device is equal or nearly so to the same human trait of the first user of the device for the same relative period. As such, there is a first-level prediction mode process running periodically on behalf of each human trait of the embodiment. The periodic rate is determined by a timer or sensory event signal, depending on the type of human trait and sensors being monitored. In the first level prediction mode, data from a plurality of sensory input devices 8/11/12/13/14/15/16/17/18/19/20/93/95, Global Positioning System (GPS/GNSS) receivers 91, Wi-Fi transceivers 96, cellular network transceivers 80, external sensors connected through, for example, Bluetooth transceivers 94, and input devices (e.g. touch screen interface 92) are captured by the personal identification system 102. One of the sensory values is a time of day and day of the week.

The personal identification system 102 compares this data to previously stored data in the first user knowledge base 100. Comparison is accomplished by provisioning a mathematical process 300 from first user knowledge base 100 with human trait event data for the relative time period of this first level predictive event and then inputting to provisioned mathematical process 300 the sensory data just captured thus producing as an output value from neuron 320 a probability factor indicating the likelihood the newly acquired present user human trait value equals that of the first user P(FU). The resulting P(FU) value is stored to first user knowledge base 100 associated with the human trait.

By way of example of the first level predictive process, consider a first level predictive process of an IRIS scan human trait of a present user of the device having brown eyes as compared to the same human trait taken from first user knowledge base 100. If the first user has blue eyes then the resulting P(FU) value would be quite low indicating inequality while if the first user eye color is hazel then the P(FU) value may be somewhat higher, perhaps so much so as to be considered inconclusive, and if the first user eye color is brown then the P(FU) value would be very high indicating equality.

To address the possibility of an inconclusive P(FU) value, the embodiment implements a spontaneous demand for proof of identity from the present user of the device. While the type of proof is a function of the embodiment implementation, it may include such proofs as password, PIN, secret phrase or a biometric such as fingerprint, palm print, voice or sound signature snippet, retinal scan or other such secret identifiers known only to or produced by the first user.

Of note is the security PIN which is one form of proof. The first user is required to select a security PIN early in the initial machine learning process. Initial entry of the security PIN is by use of the mobile device touch screen wherein the user enter a personal identification number one-character code at a time. The input process captures both the character code and its sequence such that when complete the string of entered codes represents the secure PIN as known by the personal identifier. As each character code is entered the device biometrics at the instant of input are also capture in sequential order. The biometrics are comprised of device orientation and rotation as well as the latency time between character code entries with a latency of 0 for the first character code. The biometrics like the character codes are assembled in sequential order and become known as the first set of biometrics. During that initial period from time to time selected randomly by the learning process the first user is required to reenter their security PIN, in other words, input a security PIN character code by character code in the same sequence as originally entered. This repeated process contributes to both the machine learning process and to that of the first user in aiding their memorization process. Of specific note for the machine learning process is the fuzziness inherent in the learned profile. Indeed, it would be difficult for a first user to reenter their secure PIN the same way every time should binary matching be employed. A result of repeated reentries during machine learning softens the edges of the matching process thereby achieving fuzzy matching allowing the first user certain latitudes without diminishing the security of the secure PIN. Accommodation of this fuzzy nature of secure PIN may be done by mathematical process such as those common in neural networks wherein the weights and biases of the network neurons are saved as secure PIN artifacts of the mathematical process such that those same secure PIN artifacts can be used to provision like networks for prediction processing.

At any point following the initial machine learning period and in the event of inconclusive identification of the person in possession of the device a request for the security PIN is presented to the person in possession at the time. The response to the request will indicate possession by first user or not. The security PIN like the artifacts of all IDTRAITS are encrypted and securely stored in the trusted executing environment of the device. Disclosed are unique methods of security PIN entry checks employed to ensure the impossibility of guessing or spoofing the value of the security PIN. In the exemplary embodiment, the security PIN is made up of the numbers 0 through 9 and letters A through F and input by the user via a sixteen-tile array presented on the touch screen. During initial creation of the security PIN not only are the tile values captured but so too all aspects of device position status and latency timing between tile taps. During initial machine learning these parameters are refined to a set of values reflective of the first user's use of the device when inputting their security PIN. The first user can determine the length of the security PIN. The greater the length the better the security but the more difficult it is to remember. By employing use of sequence combined with all aspects of device handling during the security PIN entry process, a security PIN length of just five characters produces a probability of duplication of one in fifty-five million.

Throughout the initial learning process, the first user is required to input their security PIN both to reinforce it in their mind and to learn the outer boundaries of the security PIN attributes. In this way, fuzzy matching can be employed by predictors to avoid over sensitive aspects of absolute matching. Although the use of security PIN would be the preferred embodiment, use of more contemporary methods of identity verification such as password, PIN, fingerprint, palm print, facial image, iris scan, spoken phrase or one-time password are not foreclosed. Comparison of proofs is made using those from the first user knowledge base 100 with the results used to push the probability value P(FU) to either one extreme or the other.

In the event that proof of identity establishes the present user is the first user then in this case a learn by experience mode is employed that is like the training and learning mode but limited to updating the current knowledge base 100 entry for this human trait event, aligned to time, refining the knowledge base 100 entry to become more accurate and/or to accommodate for temporary or permanent first user lifestyle change.

Figure 7A:
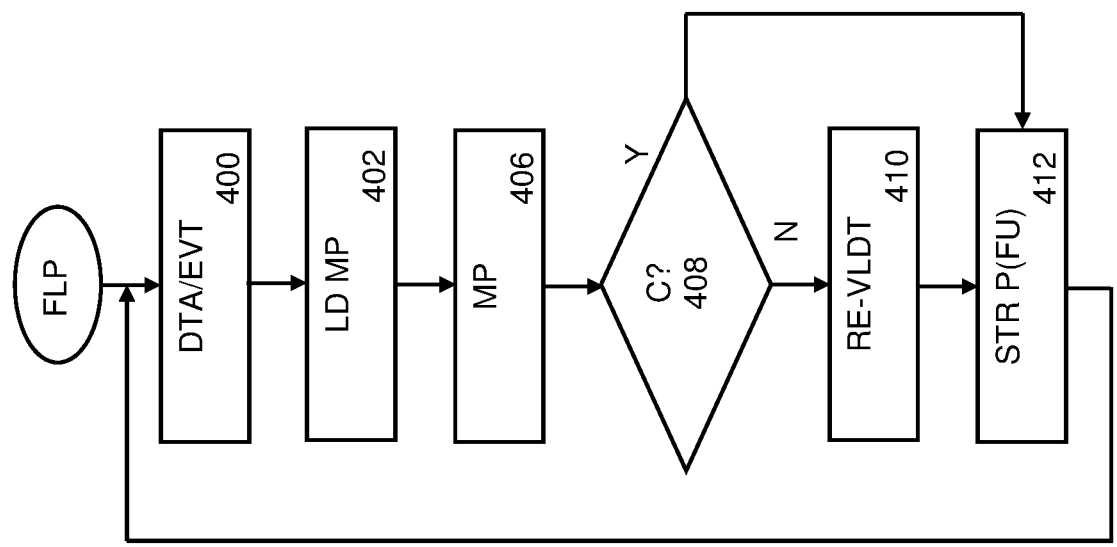
FIG. 7A illustrates an exemplary program flow during the first level predictive process of the personal identification system.

Referring now to FIG. 7A flow chart, an exemplary first level prediction mode, is described. First level predictors are looping functions that have no end. Their purpose is to periodically produce a probability value P(FU) indicative of the present user of the device being the first user of the device, storing the findings to knowledge base 100. The prediction process begins on time out of a timer or on receipt of a sensory event signal at which point sensory data is collected 400 from a plurality of sensors, one of which is time. Based on the time, including the day of the week, a mathematical process is provisioned 402 with mathematical process artifacts taken from first user knowledge base 100 for the human trait being monitored by this first level predictive process. The collected sensory input data is then inputted to the provisioned mathematical process 406 resulting in a P(FU) value that indicates a conclusive or inconclusive result. If inconclusive 408 then the present user of the device is required to provide proof of identity 410 in the form of, for example password, PIN, secret phrase or a biometric such as fingerprint, palm print, voice or sound signature snippet, retinal scan or other such secret identifiers known only to or produced by the first user and upon validation of the proof provided by comparison to like type of proof master from the first user knowledge base 100 and thereby updating the probability P(FU) value to a conclusive state. The final probability of possession by first user factor P(FU) is stored 412 in first user knowledge base 100 after which the first level predictive process returns to await the next periodic event 400.

Figure 4A:
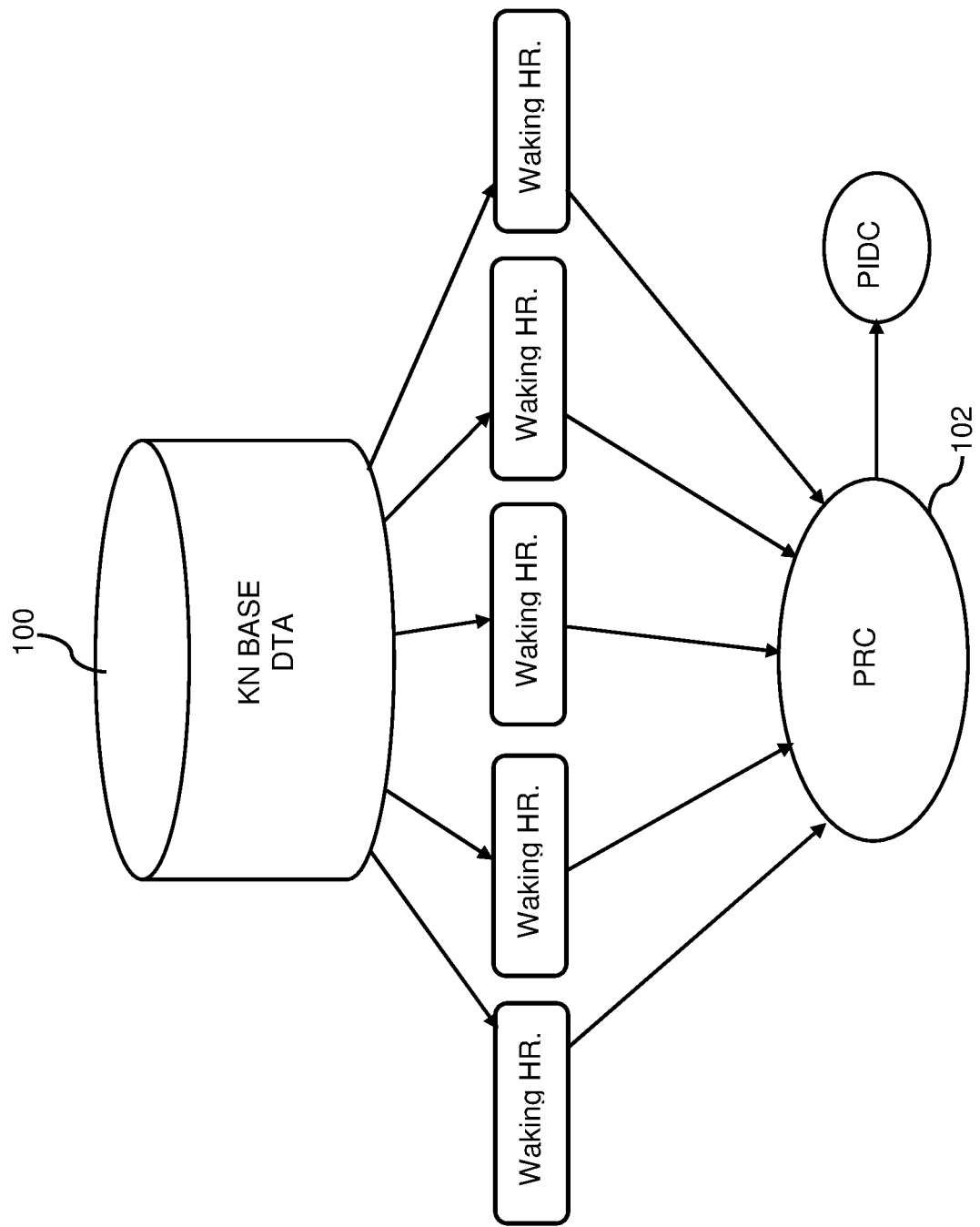
FIG. 4A Illustrates a usage mode of the personal identification system in second-level predictive mode.

Referring to FIG. 4A, the second level prediction mode, is described. The second level prediction mode produce and deliver a personal identification code output to an inquisitor who is seeking to learn if the present user of the device is, in fact, the first user of the device. This determination is arrived at by this second level predictive process of evaluation of the probability factors P(FU) of all human traits being monitored by the embodiment and from that producing a final probability factor FP(FU) indicating the likelihood the person in possession of the device is or is not the first user of the device.

While human trait probability of possession by first user P(FU) are reliable indicators contributing to determination of identity, they cannot serve to do so singularly nor do all human trait probability apply equally to both positive and negative determination and the contribution made diminishes with time and there is always the possibility that a human trait cannot be determined at all. These possibilities are addressed by weights, deviation, and diminishment values that are applied to mathematical process calculations.

In some embodiments, there are 2 weights applicable to the contribution made by a human trait probability factor P(FU) to the calculation of the final probability factor FP(FU), the positive weight and the negative weight. The positive weight indicates the influence the human trait factor makes to the calculation of the final factor when the probability of the human trait is positive and negative weight is applied in the case of human trait factor being negative. As an example, consider handedness. If the first user is right-handed and if the present user is right-handed, as are approximately 75% of humans, then the positive weight would be quite low, perhaps in the 25% or lower neighborhood. However, if the present user is left-handed, then the negative weight would be set quite high, perhaps to 99%. Weights are unique to each human trait and in some embodiments, not be used at all.

The deviation trait simply indicates a deviation from the expected. For example, if the human location trait is expected to have a first-level predictive iterative cycle of once per hour and if it's been 3 hours since the last renewal, then there is a deviation of 2 hours that must be factored negatively into the calculations to establish a probability of possession of the owner. The deviation is unique to each human trait and may, in some embodiments, not be factored at all. The possibility of deviation arises on those human traits dependent on sensor event to initiate human trait capture and calculation. In the example provided here, if the capture of the location trait were the result of accelerometer event and if there is no accelerometer event, then it is likely a deviation would exist.

Diminishment applies to human trait probability of possession factors as those factor values age. For example, the location may be on a 1-hour first level predictive cycle and when first captured each hour, contributes 100% of its value, after adjusted for weights, to the calculation of the final probability of possession FP(FU) factor. However, as time ticks away toward the next iterative cycle, the contribution location makes to the final probability calculation must be diminished to account for the aging. Diminishment value is unique to each human trait and may, in some embodiments, not be used at all.

In the first level predictive mode, the probability factor P(FU) for each human trait being monitored by the embodiment are computed and stored in first user knowledge base 100. Those probability factors P(FU) serve as input to the personal identification system 102 in second-level predictive mode being fed into a mathematical process, also provisioned from first user knowledge base 100. The output of the mathematical process is a final probability of possession by first user FP(FU) factor that is then combined with unique device identifiers, such as SIM card IMSI and Bluetooth BD_ADDR identifiers and optional unique session identifier token, to produce the personal identifier code. The personal identification code, when requested, is provided to an inquisitor seeking to know if the device is in possession of the first user of the device. For example, the inquisitor may be a remote computer seeking identification by text message to the device known to belong to the first user of the device. In another example, the inquisitor may be an access control device to a building, car, plane, boat or ATM, or perhaps even an access gate replacing the TSA credentials inspector that seeks proof of identity by a query using Bluetooth to the device known to belong to the first user. In yet another example, the query may be by a barcode scanner at a retail checkout counter wherein the personal identifier code is presented on the display of the personal identification device and it, the bar code, is then read by the barcode scanner.

Another example might be a data security inquisitor App running on the personal identification device that upon learning the device is not in possession of the first user, takes defensive steps to protect user data by erasing or encrypting it to prevent the data falling into unwanted hands. No matter the query source, its structure may range from a very simple query for personal identifier code to more complex query inclusive of a unique session identifier. The unique session identifier, if provided, is signed using the private key and then amalgamated to create the personal identifier code. Inclusion of unique session identifier token in the initial query is acknowledged by the personal identification device. The response prompted by the inclusion of the unique session identifier token in the query establishes the token was received and the round-trip time required doing such. Confirmation of session identification token eliminates the possibility of cellular account hijacking and reduces the potential of man-in-the-middle attack while the inclusion of the unique session identifier token in the personal identification code further reduces the risk of a man-in-the-middle attack.

Figure 7B:
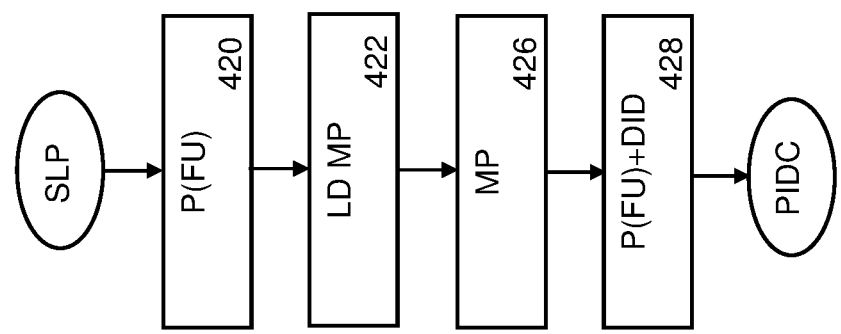
FIG. 7B illustrates an exemplary program flow during the second level predictive process of the personal identification system.

Referring now to FIG. 7B flowchart, an exemplary second level prediction mode, is described. The second level prediction mode is initiated upon receipt of an inquisitor request for production of the current personal identification code. The current personal identification code is an amalgamation of a final probability of possession by first user factor FP(FU) with device identification that in an exemplary embodiment would be the subscriber identity module (SIM) identifiers plus another unique identifier such as the Bluetooth BD_ADDR. Thus, from this single code the inquisitor is assured the unique personal identifier device assigned or belonging to the first user of the device is or is not in possession of the first user of the device. Production of the personal identifier code begins with retrieving from knowledge base 100 the probability of possession by first user P(FU) 420 for each human trait of the embodiment followed by provisioning a mathematical process 422 with data likewise retrieved from the knowledge base 100. The collection of human trait probability factors P(FU) is then inputted to the mathematical process 426 thereby producing a final probability of possession of first user factor FP(FU) that is then amalgamated with device identifiers to form the personal identification code PIDC and deliver it to the inquisitor.

Figure 8:
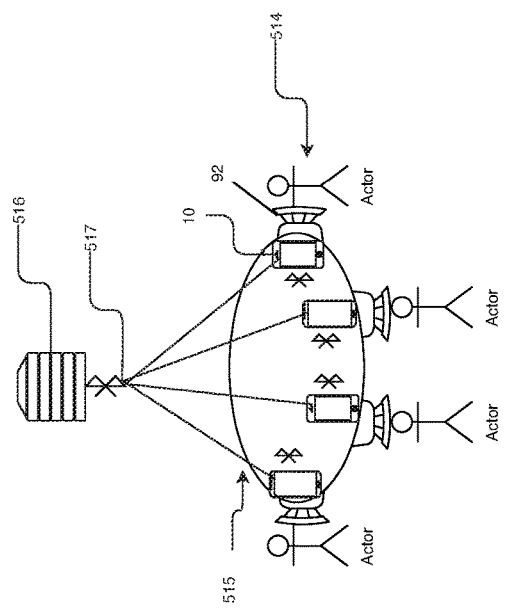
FIG. 8 depicts an application of a personal identifier wherein personal identifiers are employed in the role of speaker identification.

With reference to FIG. 8, an exemplary embodiment application of personal identification system 102 in a multi-party conference application is shown. One application of the personal identifier is for establishing a person is who they claim to be in order to gain access to a resource, service, thing, or entitlement. In some embodiments, another role for personal identification is that of speaker identification in a multi-party group setting, as shown in FIG. 8. The cell phone 10 performs as a personal identifier device. In this role for multiple actors 514, each in possession of their own cell phone 10, each performing as a personal identification device, allowing accurate speaker identification. As each actor 514 speaks, their cell phone 10 (personal identification device) captures their spoken utterance via microphone 92. Audio signal analytics confirm origination source and properly attribute the utterance to the user assigned to the respective cell phone 10. Upon confirmation of attribution to the user, the audio signal in digital form is transferred by appropriate network facilities, for example, Bluetooth networks 515, to a Bluetooth transceiver 517 at a central point of collection 516 that receives the audio signals. Bluetooth is shown for example as any suitable network is anticipated. In this way, all conversations of those taking part in the session (e.g. actors 514) are captured in sequential order with over talk recognition and accurate attribution of utterance to the person producing the utterance.

Figure 8A:
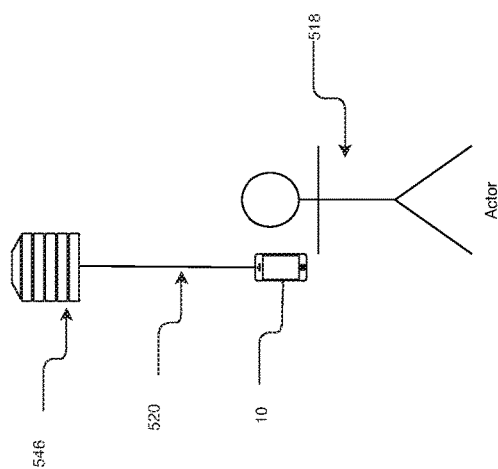
FIG. 8A depicts a user operating and in control of a voice-operated device by use of their personal identifier and spoken utterances.

With reference to FIG. 8A, an exemplary embodiment application of personal identification system 102 to a single-party voice command and control application is shown. As discussed, one application of personal identifier is for establishing a person is who they claim to be to gain access to a resource, service, thing, or entitlement. In the embodiment shown in FIG. 8A, personal identification is used for speaker identification in a single or shared user voice command and control setting. Prior voice-activated command and control systems suffer from weak or nonexistent security and little or no confirmation of speaker identity. Even the most sophisticated prior systems using signal analysis to identify the speaker suffer from accuracy problems resulting in false identification. As such, there are many potential applications of the technology that opt not to use such. A bank, for example, will not accept voice-command access to client accounts without assurance of the speaker's identification. Attempts to remedy this weakness by use of speech recognition have proven unsuitable because of inaccuracy and the ease of impersonation. Addition of reliable identification and security opens countless futuristic applications of voice control such as the automobile where the vehicle owner speaks "car start," "car unlock," "car come," "car heater on" and so on. Another application is access or process control such as "door open," "lights on," "security system off" when approaching home or office. Banking examples such as "bank display balances," or "bank transfer one hundred dollars to son." Office automation such as "office book ten to ten thirty for Jon" or "login accounts payable." Each of these and many more applications are attainable given security and accuracy of speaker identification. The present invention accomplishes this with the addition of "speaker identification" to the personal identifier. Turning to FIG. 8A we have a user 518 with a cell phone 10 having personal identification enabled. The cell phone 10 is connected to networks 520 and to voice command and control device 546. Voice command and control device 546 is anticipated to be any technology wherein voice commands are received over a networks 520, and the voice commands are decoded and employed to perform any anticipated control function. The cell phone 10 (Personal identification device) operates the speaker identification processes implementing the functions and facilities of the present invention. The network 520 is any networking topology capable of delivering digital data between two points. In some embodiments, initiating of a session is done by voice command at the cell phone 10. In some embodiments, initiating of a session is done by the user 518 over a cellular call or by network notification using WiFi, Bluetooth or any suitable network. Once initiated, the cell phone 10 operates as a voice command and control device, transmitting a possession status with a unique session identifier token for speaker identification over networks 520 to a voice command and control device 546. Subsequently the user speaks normally as would be done using the smartphone. The spoken utterances are captured by the cell phone 10 acting as a personal identification device, and operating an implementation of the disclosed speaker identification. The identity of the person in possession is captured and concatenated with the captured utterance, device identifiers and the unique session identifier token as a personal identification code. The personal identification code is then transmitted, either encrypted or not, over networks 520 to the voice command and control device 546. Upon receipt of the personal identification code package, the voice command, and control device 546 verifies, authenticates, evaluates the probability of possession by the first user, device identifiers and unique session identifier token and, assuming all tests pass, perform the command identified by the utterance.

Until now, the descriptions of identification of a first user of the personal identification device has focused on the positive indication. For example, a positive indication of human traits generally falling in the class of IDTRAITS as compared to those of a known first user contribute to establishing the identity of the persona in possession of the device. Attention is also drawn to the negative indications as negative indications have much to contribute to the identification process. For example, the possession status of the cell phone 10 (personal identification device) is negatively influenced when the device is not in recognized geophysical or radiofrequency locations. Disclosed in the present invention is the use of tracker devices to extend the area of recognition. Specifically, if the presence of a tracker device is detected, then the probability the device is in near-proximity possession of a first user is positive and increased. But, if the registered tracker device is not detected, then the probability the personal identification device is in possession of the first user is negative and decreased. Nearfield trackers, as used herein, are radiofrequency devices that can be registered with and identified by the personal identification device.

Unique session identifiers are employed by remotely located service providers and Personal Identification devices in the authentication process to uniquely identify each individual authentication session. The service provider creates the Unique session identifier token to verify the round-trip travels identification request query messages s, encrypts it using the service provider public encryption key and transmits it to the Personal Identifier device. The person identifier device upon verifying the person in possession of the Personal Identification device is the first user will sign the Unique session identifier token using its private key and then transmit the signed unique session identifier token results back to the service provider where the signed unique session identifier token is validated to complete the authentication process. Encryption and cryptographic digital signing are well understood secure methods for exchanging messages. Exchange of this Unique session identifier token may occur over a primary network channel, or it may occur over a combination of both the primary network channel and an out-of-band network channel. The encrypted Unique session identifier token is transmitted to the Personal Identification device over either the primary or the out-of-band network channel. The signed unique session identifier token is always returned to the service provider over the primary network channel. Use of multiple channels reduces substantially the risks of MITM attack.

Enhanced security of the communications process between the service provider and Personal Identification device during the authentication process by exchanging secure messages that are realized by addition of One-Time-Pad key encryption of said messages. During a registration process the remotely located mobile personal identification device provides to the remotely located service provider a One-Time Pad seed, said One-Time Pad seed to be used for encrypting the first request query message sent by service provider to the remote mobile device. One-Time Pad seeds are used by the service provider and a remotely located mobile device to produce One-Time Pad keys that are then used to encrypt challenge messages and challenge response messages. In operation the service provider creates and encrypts the unique session identifier token as per normal. It then produces a challenge message comprising the encrypted unique session identifier token and the next to use service provider One-Time Pad seed. The most recent identification device One-Time Pad seed is used to produce a new One-Time Pad key that is then used to encrypt the challenge message. The challenge message is then sent as described above. Receiving the challenge message, the identification device uses its most recent One-Time Pad seed to produce a One-Time Pad key using that key to decrypt the challenge message. The new service provider One-Time Pad seed is set aside. The unique session identifier token is signed as per above, a new identifier device One-Time Pad seed is produced and combined with the signed unique session identifier token to create the challenge message response. The most recent service provider One-Time Pad seed is used to produce a new One-Time Pad key that is then used to encrypt the challenge message response which is then transmitted back to the service provider. In the identification device the service provider One-Time Pad seed that was set aside above becomes the next service provider One-Time Pad seed to be used. The service provider upon receiving the challenge message response uses it last One-Time Pad seed to produce a new One-Time Pad key that is then used to decrypt that message. The signed unique session identifier token is validated and if all good the authentication is approved, and access allowed. Key to this this process is the One-Time Pad key length which must equal or exceed the size of the message to be encrypted.

An implied and important component of any embodiment of a personal identification device (mobile device) is that of detecting and recognizing device possession by a human. If the device fails to perform this basic validation, the mobile device's role as a device to identify a human is nullified. For this reason, an automated method of doing such is disclosed.

The personal identification device can be in only two states, those of OFF or ON, and only four states of ON including, static, in motion, moving, or in motion and moving. Each of the ON states can be subdivided into the states of ON and active, ON and inactive or ON and screen OFF (sleep mode). While in an ON state it is possible for the device to be in the possession of a human or not. There is also the possibility of it being in the possession by a virtual human mimicked by BOT running on the device. Disclosed is a method to prevent the virtual human from impersonating the real human. Detection and recognition of human in possession necessitates awareness of device state and motion indicators. Sensors of the mobile device are employed to recognize these states and to recognize when a human is in possession of the device, said sensors including motion sensor, accelerometer, gyroscope, linear accelerometer, rotation vector and orientation sensors. Detection of motion is such as to eliminate false positives induced by background ambient motion and variations. The transition from the OFF to the ON state would, under normal circumstances, be indicative of human presence. Assurance of that possibility is provided from other sensor inputs. Compass sensor movement indication by more than fuzzy degrees indicates motion and possibility of human in possession. Accelerometer indication of acceleration by more than fuzzy m/s2 indicates motion and possibility of possession by human. Gyroscope sensor input indication of a ration greater than fuzzy degrees along any axes indicates motion and possibility of possession by human. Magnetometer sensor indication of geomagnetic field change in excess of fuzzy microtesla (uT) indicates motion and the possibility of human in possession. Rotation sensor pitch and roll axis change exceeding fuzzy degrees is an indication of motion and possibility of possession by human. Orientation indication of motion on either of three axes azimuth, pitch and roll by more than fuzzy degrees indicates motion and the possibility of possession by human. Employing all of these sensor inputs produces an accurate reflection of device possession by a human. Some sensor combinations increase the probability of possession by human above 95%. Screen or Display ON or OFF event combined with any of above. Logon or unlocking event notification combined with any the above. In the above, fuzzy indicates a range of truth with narrower ranges being more sensitive. The circuit must be tuned, and the fuzzy range established during the machine learning phase when possession by first user is known and the fuzzy patterns indicative of a first user can be established and memorized for future comparisons by predictors. A strong indicator of possession by human is screen ON, login, and screen unlock events. By adding to these events recognition of device rotation and orientation is produced very accurate identification attributes of the first user. Using this knowledge is the first accurate indication of a human in possession and probability that human is the first user. In combination with human traits, the accuracy of predicting possession by first user is greatly enhanced. During an initial machine learning process this evidence of first user in possession are processed with the artifacts of that processing being stored in the first user profile. Subsequently once device possession by human is established the probability of possession of the device by the first user is established employing a prediction process provisioned with the learned artifacts.

Constructing a histogram of device usage during the initial machine learning period is also disclosed as a means of tuning the identification process. The histogram records all major device events by event type and time such that after seven days an accurate reflection of the user is achieved. Such events would include but not be limited to: device ON, device OFF, battery charging ON, battery charging OFF, geographic points of location, RF reflected points of location, screen ON, screen OFF, and Login. All of these and more establish a histogram indicative of when events should and should not happen. A single event occurring when it should not or an event not occurring when it isn't by itself indicative of a person's identity, but when combined with other IDTRAIT indicators can serve to improve the accuracy of prediction of possession status. For example, should the first user normally pick up and activate their identification device between 0600 and 0630 each day of the week and there comes a day when that does not occur then circuits within the invention that detect and recognize IDTRAITS can be set to a more sensitive state by adjustments made to neuron weights and biases of the prediction match algorithms. Using this same example, similar would result if the device were activated at 0215, again an event recognized to be occurring outside the fuzzy window of normalcy. The entire purpose and application of the histogram in the identification process disclosed here is to establish points where circuit sensitivity can be adjusted to account for normal or abnormal behaviors, to put IDTRAITS predictors on notice so to speak. Another example, device activation occurs at 0215 well outside normalcy and coincident with that the IDTRAITS audio circuits detect the sounds of a siren and the emotion circuits detect and register the state of alarm or distress and the motion circuits detect hyper motion. A probability of an emergency is indicated that could trigger reactive measures, for example auto dialing an emergency response number. Other automated applications are recognized as possible when combining use of the histogram and IDTRAIT circuits.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for detection and identification of a human in possession of a mobile device comprising:
    during an initial machine learning period in which the mobile device is in the possession of a first user, capturing biometrics indicative of the first user and processing the biometrics by mathematical processes thereby producing and storing learned mobile device biometrics;
    during the initial machine learning period, the first user entering a security pin on a touch screen of the mobile device and capturing both a first set of character codes and a first set of biometrics per code inclusive of latency from a prior code or zero if first code and storing in the mobile device the first set of character codes and first set of biometrics inclusive of latency time;
    during the initial machine learning period, periodically requesting that the first user reenter said security pin on the touch screen of the mobile device, while the first user is reentering the security pin, verifying the character codes, capturing the biometrics as the first user is reentering the security pin, inclusive of latency, and updating the first set of character codes and first set of biometrics inclusive of latency time;
    during the initial machine learning period in which the mobile device is in the possession of the first user, detecting motion of the mobile device by reading sensor data from sensors integrated into the mobile device, creating motion indicators from the sensor data, and categorizing the motion indicators, recognizing the motion indicators that are most likely a result of human possession of the mobile device;
    after the initial machine learning period, recognizing mobile device possession by the human and calculating a probability of possession of the mobile device by the first user by comparing current mobile device possession biometrics with the learned mobile device biometrics indicative of the first user;
    when probability of possession of the mobile device by the first user is inconclusive, requesting the first user enter the security pin and while the first user is entering the security pin on the touch screen of the mobile device, verifying that the character codes entered match the first set of character codes and verifying that the biometrics and latency of those codes entered match the first set biometrics and latency, using affirmative match to weight probability of possession in favor of possession by first user;
    producing one-time pad cryptography keys using one-time pad seeds;
    exchanging secure messages with a remote apparatus over data communications networks, identifying each message uniquely from all others, securing those message exchanges by use of the bidirectional one-time pad cryptography keys;
    affirming the possession status of the mobile device within those messages as indicative or not of mobile device possession by the first user of the device;
    detecting initial mobile device possession by the human from analysis of sensory inputs indicative of device motion including a significant motion event in conjunction with deviations detected in data selected from the group consisting of accelerometer sensor input data, gyroscope sensor input data, linear acceleration sensor input data, and rotation vector sensor input data;
    detecting mobile device possession by human by use of sensor inputs indicative of step detection events, device shake events, device tilt events as well as events indicative device rotation pitch and roll and device orientation azimuth, pitch and roll; and
    categorizing those sensor inputs to establish the mobile device is in motion as opposed to background sensory signaling and further analyzing those categories to recognize when a device motion is likely to be a result of human possession and activity.

2. The method of claim 1 wherein the step of capturing both the first set of character codes and the first set of biometrics of those codes when entered comprises:
    capturing multiple touch screen inputs representative of character codes of a personal identification number;
    for each input event, capturing and identifying a character code value and storing the character code values in sequence as they are input;
    for each input event, capturing a latency between a prior input event and the input event, using a latency value of zero for a first input event;
    for each input event, capturing orientation data of the mobile device, including device orientation azimuth and pitch and roll;
    for each input event, capturing a rotation pitch and roll data of the mobile device;
    ingest into a machine learning process the character codes, the latency, the orientation data, and the rotation pitch and roll data representing event parameters, producing as output of said machine learning process a set of artifacts representative of biometric inputs; and
    store the set of artifacts in a first user profile.

3. The method of claim 1 wherein the step of verifying those character codes, sequence and biometrics comprises;
    provisioning the machine prediction process with the first set of character codes and first set of biometrics inclusive of latency time of the first user from the mobile device;
    capturing multiple touch screen input codes representative of the security pin;

for each touch screen input code, storing the character code in sequence;
for each touch screen input code, capturing a latency between a prior touch screen input code, using a zero latency for a first touch screen input code;
for each touch screen input code, capturing orientation data that includes azimuth, pitch and roll of the mobile device;
for each touch screen input code, capturing rotation pitch and roll data of the mobile device;
providing the character codes, the latencies, the orientation data, and the rotation pitch and roll data into the machine prediction process in the same order as done during the initial machine learning period thereby producing as output an indication of a match between the security pin of the first user and the security pin of a person now in possession of the mobile device.

4. A method for detection and identification of a human in possession of a mobile device comprising:
during an initial machine learning period in which the mobile device is in the possession of a first user, capturing biometrics indicative of the first user and processing the biometrics by mathematical processes thereby producing and storing learned mobile device biometrics;
during the initial machine learning period, the first user entering a security pin on a touch screen of the mobile device and capturing both a first set of character codes and a first set of biometrics per code inclusive of latency from a prior code or zero if first code and storing in the mobile device the first set of character codes and first set of biometrics inclusive of latency time;
during the initial machine learning period, periodically requesting that the first user reenter said security pin on the touch screen of the mobile device, while the first user is reentering the security pin, verifying the character codes, capturing the biometrics as the first user is reentering the security pin, inclusive of latency, and updating the first set of character codes and first set of biometrics inclusive of latency time;
during the initial machine learning period in which the mobile device is in the possession of the first user, detecting motion of the mobile device by reading sensor data from sensors integrated into the mobile device, creating motion indicators from the sensor data, and categorizing the motion indicators, recognizing the motion indicators that are most likely a result of human possession of the mobile device;
after the initial machine learning period, recognizing mobile device possession by the human and calculating a probability of possession of the mobile device by the first user by comparing current mobile device possession biometrics with the learned mobile device biometrics indicative of the first user;
when probability of possession of the mobile device by the first user is inconclusive, requesting the first user enter the security pin and while the first user is entering the security pin on the touch screen of the mobile device, verifying that the character codes entered match the first set of character codes and verifying that the biometrics and latency of those codes entered match the first set biometrics and latency, using affirmative match to weight probability of possession in favor of possession by first user;
producing one-time pad cryptography keys using one-time pad seeds;
exchanging secure messages with a remote apparatus over data communications networks, identifying each message uniquely from all others, securing those message exchanges by use of the bidirectional one-time pad cryptography keys;
wherein recognizing the mobile device possession by the human is first established by:
detecting a state of mobile device possession from device events selected from the group consisting of motion, device unlocking, device display ON, device logon, and device display OFF;
for each event, capturing data from sensors of the mobile device a set of movement biometrics including mobile device orientation azimuth, pitch and roll, mobile device rotation pitch and roll, and device motion from motion sensor, accelerometer, gyroscope and acceleration sensors;
during the initial machine learning period, capturing the movement biometrics and reducing the movement biometrics into mathematical artifacts representative of the movement biometrics indicative of the first user and storing the mathematical artifacts in a first user profile; and
after the initial machine learning period, capturing new movement biometrics and reducing the new movement biometrics into new mathematical artifacts and provisioning the machine prediction process with the mathematical artifacts of the first user from the machine learning first user profile and with the new movement biometrics, and thereby producing an output probability indicative of the mobile device being used by the first user.

5. A method for detection and identification of a human in possession of a mobile device comprising:
during an initial machine learning period in which the mobile device is in the possession of a first user, capturing biometrics indicative of the first user and processing the biometrics by mathematical processes thereby producing and storing learned mobile device biometrics;
during the initial machine learning period, the first user entering a security pin on a touch screen of the mobile device and capturing both a first set of character codes and a first set of biometrics per code inclusive of latency from a prior code or zero if first code and storing in the mobile device the first set of character codes and first set of biometrics inclusive of latency time;
during the initial machine learning period, periodically requesting that the first user reenter said security pin on the touch screen of the mobile device, while the first user is reentering the security pin, verifying the character codes, capturing the biometrics as the first user is reentering the security pin, inclusive of latency, and updating the first set of character codes and first set of biometrics inclusive of latency time;
during the initial machine learning period in which the mobile device is in the possession of the first user, detecting motion of the mobile device by reading sensor data from sensors integrated into the mobile device, creating motion indicators from the sensor data, and categorizing the motion indicators, recognizing the motion indicators that are most likely a result of human possession of the mobile device;
after the initial machine learning period, recognizing mobile device possession by the human and calculating a probability of possession of the mobile device by the first user by comparing current mobile device possession biometrics with the learned mobile device biometrics indicative of the first user;

when probability of possession of the mobile device by the first user is inconclusive, requesting the first user enter the security pin and while the first user is entering the security pin on the touch screen of the mobile device, verifying that the character codes entered match the first set of character codes and verifying that the biometrics and latency of those codes entered match the first set biometrics and latency, using affirmative match to weight probability of possession in favor of possession by first user;

producing one-time pad cryptography keys using one-time pad seeds;

exchanging secure messages with a remote apparatus over data communications networks, identifying each message uniquely from all others, securing those message exchanges by use of the bidirectional one-time pad cryptography keys;

wherein exchanging secure messages between the mobile device and the remotely located service provider comprises:

during a registration process, the mobile device producing and transferring to the remotely located service provider a one-time pad seed to be used for production of the mobile device one-time pad key;

production by the remotely located service provider of a unique session identifier token to identify round-trip travels of an identification query message;

the remotely located service provider producing and the identification query message containing a public key encrypted session identification token and service provider one-time pad seed, the query message being encrypted using a one-time pad key produced from the mobile device one-time pad seed known to the service provider and transmitting the encrypted query message over a network to the mobile device;

the mobile device receiving and decrypting by use of the one-time pad key produced from the mobile device one-time pad seed said identification query message and, on condition of mobile device possession by the first user, cryptographically signing the session identification token using the private key member associated with the public key used to encrypt the token and then producing a query response message comprising the session identification token, signed or unsigned, combined with a new mobile device one-time pad seed, and the probability of possession by first user, encrypting by use of the one-time pad key produced from the one-time pad seed received in the query message and transmitting the encrypted query response message to the remotely located service provider; and the remotely located service provider receiving and decrypting by use of one-time pad key produced from the one-time pad seed created by the service provider at the time of sending the encrypted query message, the query response message, saving the mobile device one-time pad seed, verifying the session identification token is properly signed, and verifying probability of mobile device possession by the first user is in an affirmative range and thereby establishing that the mobile device is or is not in the possession of the first user.

* * * * *